US012699856B1

(12) United States Patent
Seo et al.

(10) Patent No.: US 12,699,856 B1
(45) Date of Patent: Aug. 4, 2026

(54) AUTOMATIC TRANSLATION USING AN INTERACTION APPLICATION

(71) Applicant: Delta Air Lines, Inc., Atlanta, GA (US)

(72) Inventors: William Seo, Atlanta, GA (US); Garrett Paul Simmer, Atlanta, GA (US); Mallikarjuna Bachu, Cumming, GA (US); Chinar Dankhara, Atlanta, GA (US); Vivian Aranha, Atlanta, GA (US)

(73) Assignee: Delta Air Lines, Inc., Atlanta, GA (US)

( * ) Notice: Subject to any disclaimer, the term of this patent is extended or adjusted under 35 U.S.C. 154(b) by 147 days.

(21) Appl. No.: 18/239,780

(22) Filed: Aug. 30, 2023

(51) Int. Cl.
| | |
|---|---|
| *G06F 40/58* | (2020.01) |
| *G06Q 50/14* | (2012.01) |
| *G10L 17/02* | (2013.01) |
| *G10L 17/04* | (2013.01) |
| *G10L 17/14* | (2013.01) |

(52) U.S. Cl.
CPC .............. *G06F 40/58* (2020.01); *G10L 17/02* (2013.01); *G10L 17/04* (2013.01); *G10L 17/14* (2013.01); *G06Q 50/14* (2013.01)

(58) Field of Classification Search
CPC ......... G06F 40/58; G10L 17/02; G10L 17/04; G10L 17/14; G06Q 50/14
See application file for complete search history.

(56) References Cited

U.S. PATENT DOCUMENTS

| | | | |
|---|---|---|---|
| 7,801,726 | B2 | 9/2010 | Ariu |
| 8,965,129 | B2 | 2/2015 | Rogowski et al. |

| | | | | |
|---|---|---|---|---|
| 9,237,232 | B1 * | 1/2016 | Williams | ................ G10L 17/06 |
| 10,073,843 | B1 | 9/2018 | Seligman et al. | |
| 10,319,250 | B2 | 6/2019 | Lokeswarappa et al. | |
| 11,068,662 | B2 | 7/2021 | Zorzin | |
| 2006/0285665 | A1 * | 12/2006 | Wasserblat | ......... G06Q 20/4016 |
| | | | | 704/E17.002 |
| 2015/0112685 | A1 | 4/2015 | Zhang et al. | |
| 2017/0046732 | A1 * | 2/2017 | Elmachtoub | ........... G06N 20/00 |

(Continued)

FOREIGN PATENT DOCUMENTS

| | | |
|---|---|---|
| KR | 20150090357 A | 8/2015 |
| WO | WO2019208860 | 10/2019 |

OTHER PUBLICATIONS

"Timekettle WT2 Edge/W3 Translator Device," retrieved at https://www.amazon.com/dp/B09G2X42Q9?ref_=cm_sw_r_cso_cp_apin_dp_F4VBNJSZ71MZ3C7MDA1V&starsLeft=1 on May 7, 2024.

(Continued)

*Primary Examiner* — Bhavesh M Mehta
*Assistant Examiner* — Joseph J. Yamamoto
(74) *Attorney, Agent, or Firm* — Hartman & Cittin LLC

(57) ABSTRACT

Automatic translation using an interaction application can include detecting a conversation between an agent and a customer, capturing audio data associated with the interaction, and identifying a speaker associated with speech represented by the audio data. If the speaker is determined to be the customer, a customer language can be determined, the speech can be translated from the customer language to the agent language, and the translation can be output to the agent. If the speaker is determined to be the agent, the speech can be translated to the customer language and output to the customer.

20 Claims, 19 Drawing Sheets

(56) References Cited

U.S. PATENT DOCUMENTS

| 2017/0060850 A1* | 3/2017 | Lewis .................... G06F 40/58 |
|---|---|---|
| 2020/0111476 A1* | 4/2020 | Kamano ................. G10L 15/02 |
| 2020/0226327 A1 | 7/2020 | Matusov et al. |
| 2021/0312143 A1 | 10/2021 | Trehan |
| 2021/0343270 A1* | 11/2021 | Zhang .................... G10L 15/08 |
| 2022/0166872 A1* | 5/2022 | Ramsue ............ G06Q 20/4016 |
| 2024/0420679 A1* | 12/2024 | Jindal ................... G10L 13/086 |
| 2025/0095640 A1* | 3/2025 | Wei ....................... G10L 15/063 |

OTHER PUBLICATIONS

Talking Translator Application. Retrieved from https://play.google.com/store/apps/details?id=com.translate.talkingtranslator&hl=en_US&pli=1 on May 24, 2023.
Microsoft Translator. Retrieved from https://translator.microsoft.com/ on May 24, 2023.

* cited by examiner

500

START

502
PROVIDE AUDIO TO A LANGUAGE
IDENTIFICATION MODULE

504
OBTAIN LANGUAGE INFORMATION
FROM THE LANGUAGE ID MODULE

506
DETERMINE IF
MORE THAN ONE LANGUAGE
IDENTIFIED

No

YES

508
GENERATE/OUTPUT DISPLAY
DATA WITH LANGUAGE LIST

510
DETECT LANGUAGE SELECTION

512
SET AND STORE THE LANGUAGE
FOR THE INTERACTION

514
GENERATE/OUTPUT DISPLAY
DATA SHOWING THE LANGUAGE

516
END

800K

AUTOMATIC TRANSLATION USING AN INTERACTION APPLICATION

TECHNICAL FIELD

The present disclosure relates generally to providing translation of human languages. More particularly, the present disclosure relates to automatic translation of spoken human language using an interaction application.

BACKGROUND

Unless otherwise indicated herein, all disclosures in the background are not prior art to the claims in this application and are not admitted to be prior art by inclusion in this section.

In the modern global economy, air travelers from around the world may often found far from their home countries. In some instances, airlines that accommodate travelers on international flights may have headquarters and/or hiring operations in a particular city, state, region, or country. In some cases, a large percentage of employees (e.g., agents) of some airlines may natively speak a particular language, while any number of customers (e.g., passengers) on some of the airline's flights may not be able to fluently speak the employees' language. Under various circumstances, such a language barrier may be insignificant, but in certain circumstances relevant to airlines and air travel, communication between company agents and the company's customers may be necessary, but may be difficult due to the above and/or other reasons.

DETAILED DESCRIPTION

Figure 1:
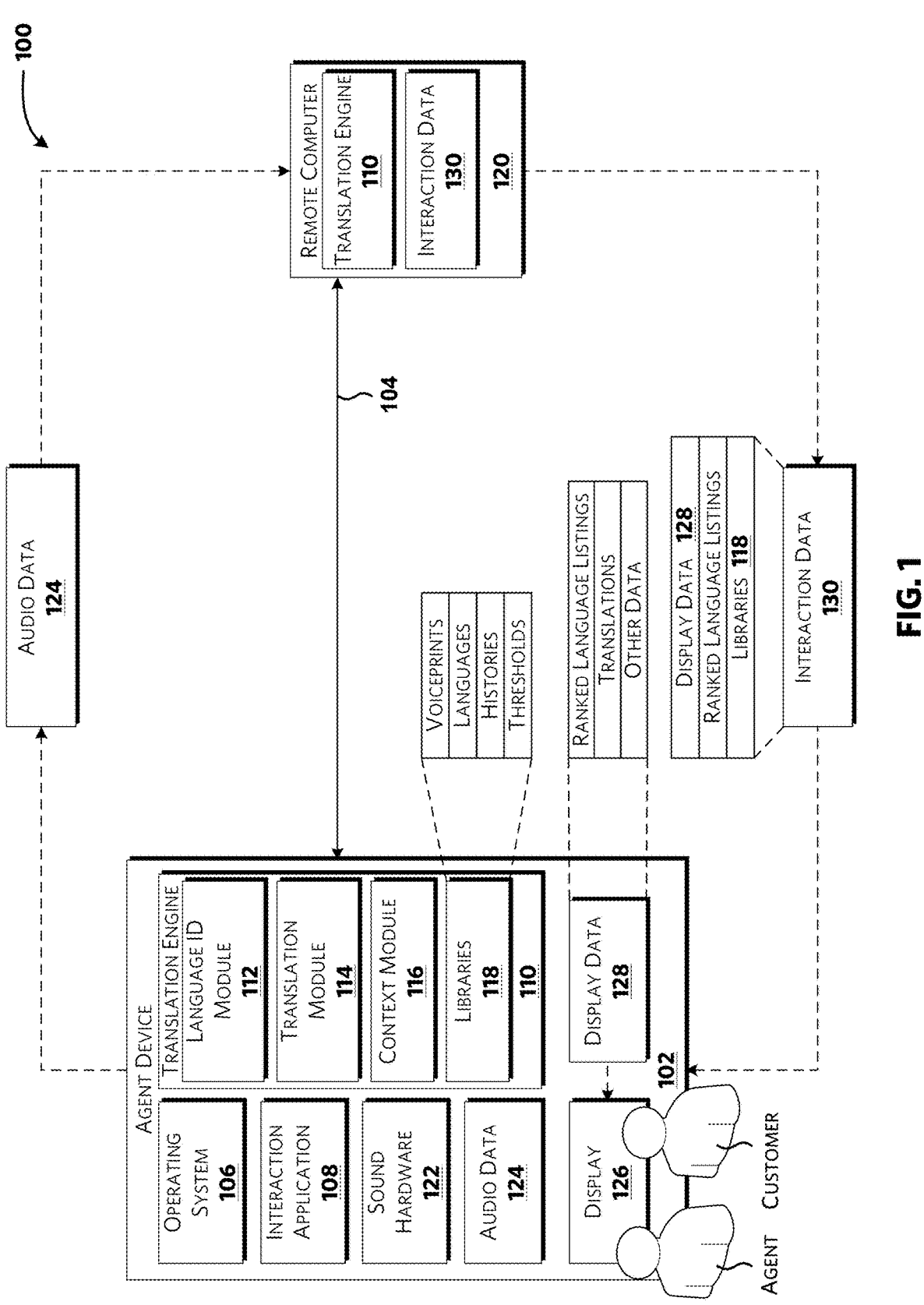
FIG. 1 is a system diagram illustrating an illustrative operating environment for various embodiments of the concepts and technologies described herein.

In the following detailed description, references are made to the accompanying drawings that form a part hereof and that show, by way of illustration, specific embodiments or examples. It must be understood that the disclosed embodiments are merely illustrative of the concepts and technologies disclosed herein. The concepts and technologies disclosed herein may be embodied in various and alternative forms, and/or in various combinations of the embodiments disclosed herein. The word "illustrative," as used in the specification, is used expansively to refer to embodiments that serve as an illustration, specimen, model, sample, or pattern.

Additionally, it should be understood that the drawings are not necessarily to scale and that some features may be exaggerated or minimized to show details of particular components. In other instances, well-known components, systems, materials or methods have not been described in detail in order to avoid obscuring other aspects of the present disclosure. Therefore, specific structural and functional details disclosed herein are not to be interpreted as limiting, but rather should be understood as merely providing an example embodiment for the claims and as providing a representative basis for teaching one skilled in the art to variously employ the concepts and technologies disclosed herein.

Additionally, while some aspects of the subject matter described herein is presented in the general context of program modules that can execute in conjunction with the execution of an operating system and application programs on a computer system, those skilled in the art will recognize that other implementations may be performed in combination with other types of program modules. Generally, program modules can include routines, programs, components, data structures, and other types of structures that can perform particular tasks or implement particular abstract data types. Moreover, those skilled in the art will appreciate that the subject matter described herein may be practiced with other computer system configurations that can include, for example, hand-held devices, multiprocessor systems, microprocessor-based or programmable consumer electronics, minicomputers, mainframe computers, and the like.

As used herein, an "interaction" can include an interpersonal spoken interaction such as a conversation between two or more individuals. According to various embodiments of the concepts and technologies disclosed herein, the "interaction" illustrated and described herein can include a spoken conversation between an airline employee or agent (hereinafter referred to as an "agent") and an airline passenger or customer (hereinafter referred to as a "customer"). It should be understood that this example embodiment is illustrative, and therefore should not be construed as being limiting in any way. Referring now to the drawings, in which like numerals represent like elements throughout the several figures, aspects of providing automatic translation using an interaction application will be described.

Referring first to FIG. 1, aspects of an operating environment 100 for various embodiments of the concepts and technologies disclosed herein will be described, according to an illustrative embodiment. The operating environment 100 shown in FIG. 1 can include an agent device 102. In some embodiments, the agent device 102 can operate in communication with a communications network or a network connection 104, though this is not necessarily the case in all embodiments. In some other embodiments, the agent device 102 may not be configured for data communication with other devices, and therefore the operating environment 100 shown in FIG. 1 should be understood as being illustrative and should not be construed as being limiting in any way.

According to various embodiments, the functionality of the agent device 102 may be provided by one or more desktop computers, one or more mobile telephones or smartphones, one or more tablet computers, one or more laptop computers, one or more SkyPro® brand handheld computing devices, one or more smartphone devices, one or more other computing devices, and the like. For purposes of describing the concepts and technologies disclosed herein, the agent device 102 is described herein as a SkyPro® brand handheld computing device or another embodiment of a special-purpose smartphone device. According to some embodiments, the SkyPro® brand handheld computing device can be built on a smartphone platform and can be installed with custom applications, modules, and/or other software, and can include and/or communicate with custom hardware and/or devices. It should be understood that this embodiment is illustrative, and should not be construed as being limiting in any way.

The agent device 102 can execute an operating system 106 and one or more application programs such as, for example, an interaction application 108, a translation engine 110, and/or other application programs. As used herein, the term "application programs" can refer to computer-executable instructions including, but not limited to, routines, processes, programs, services, applications, and/or modules. The computer-executable instructions can be executed by one or more processing devices or processing resources ("processor") to provide the functionality illustrated and described herein. Additional details of the architecture of the agent device 102 will be illustrated and described herein.

The operating system 106 can include a computer program that can be executed by a processor of the agent device 102 to control the operation of the agent device 102. The application programs (e.g., the interaction application 108 and the translation engine 110) can include executable programs that can be configured to be executed on top of the operating system 106 to provide various functions as illustrated and described herein for providing automatic translation. As shown in FIG. 1, the translation engine 110 can include one or more modules, routines, processes, applications, services, or the like such as, for example, a language identification module 112 (labeled "language ID module" in FIG. 1), a translation module 114, a context module 116, other modules, and one or more libraries 118, which can store and/or include various data, instructions, and/or other information that may be used by the translation engine 110 and/or one or more components of the translation engine 110. It should be understood that this example embodiment is illustrative, and therefore should not be construed as being limiting in any way.

As shown in FIG. 1, the interaction application 108 and the translation engine 110 (and its components, which can include the language identification module 112, the translation module 114, the context module 116, and the libraries 118) can be hosted and/or executed by the agent device 102, in various embodiments. Also as shown in FIG. 1, the translation engine 110 and/or one or more components or combinations thereof, may be hosted and/or executed by other devices (e.g., one or more server computers, remote computing devices, or the like) such as the remote computer

120 shown in FIG. 1. The description herein will primarily refer to the embodiments of the concepts and technologies disclosed herein wherein the interaction application 108 and the translation engine 110 are executed by the agent device 102 for the sake of clarity, but based on the above it should be understood that the illustrated and described embodiments are illustrative and should not be construed as being limiting in any way.

Before discussing the functionality of the interaction application 108 and the translation engine 110 in detail, other components of the operating environment 100 will be disclosed. As shown in FIG. 1, the agent device 102 can include and/or can communicate with one or more instances of sound hardware 122. In some embodiments, the sound hardware 122 can be incorporated into the agent device 102. In some other embodiments, the sound hardware 122 may be connected and/or coupled to the agent device 102. As such, it should be understood that the illustrated embodiment shown in FIG. 1 is illustrative and should not be construed as being limiting in any way.

The sound hardware 122 can include one or more devices that be configured to receive, capture, and/or otherwise obtain audio. According to various embodiments of the concepts and technologies disclosed herein, the sound hardware 122 can include, for example, one or more microphones, one or more sound sensors, and/or one or more other devices for capturing sound, sound signals, and/or audio. In various embodiments of the concepts and technologies disclosed herein, the sound hardware 122 can include an onboard microphone or sound sensor, while in some other embodiments an external microphone or sound sensor can be coupled to the agent device 102 via one or more wireless and/or wired connections. In various embodiments of the concepts and technologies disclosed herein, the sound, audio, and/or signals captured by the sound hardware 122 can be recorded as and/or converted into audio data 124. Thus, it can be appreciated that the audio data 124 can represent sound captured at the agent device 102. According to various embodiments, the audio data 124 can include, for example, audio captured during a conversation between an agent or other user and another person such as a customer. It should be understood that this example embodiment is illustrative, and therefore should not be construed as being limiting in any way.

The sound hardware 122 also can include one or more devices for outputting audio such as, for example, a speaker or other device for outputting sound and/or audio. In various embodiments of the concepts and technologies disclosed herein, the sound hardware 122 can include one or more onboard speakers, while in some other embodiments, the sound hardware 122 can include one or more external speakers, headsets, and/or other output devices that can be coupled to the agent device 102 via one or more wireless and/or wired connections. The sound hardware 122 can be configured to output audio via the speaker or other audio output device that can be included in the sound hardware 122. It should be understood that this example embodiment is illustrative, and therefore should not be construed as being limiting in any way.

The agent device 102 also can include and/or can communicate with a display 126. According to various embodiments of the concepts and technologies disclosed herein, the display 126 can include one or more devices that can be configured to output visual information such as, for example, images, text, video, translations, combinations thereof, or the like. According to various embodiments of the concepts and technologies disclosed herein, the display 126 can include an onboard display of the agent device 102. In some other embodiments, the display 126 can include an external display (e.g., a monitor or the like), which can be coupled to the agent device 102 via one or more wireless and/or wired connections. In various embodiments of the concepts and technologies disclosed herein, visual information can be generated by the agent device 102 for output on the display 126 via the agent device 102 rendering one or more instances of visual data such as, for example, display data 128. It should be understood that this example embodiment is illustrative, and therefore should not be construed as being limiting in any way.

It can be appreciated that the display data 128 can include data that, when rendered by the agent device 102, can represent various types of information associated with the concepts and technologies disclosed herein for providing automatic translation during an interaction. Thus, the display data 128 can be rendered to display and/or represent, for example, one or more words or phrases; one or more indications of languages detected and/or being spoken during an interaction; one or more instances of history information associated with an interaction and/or one or more devices or users; one or more controls and/or options for changing languages, settings, or the like; and/or other information. Some example screen displays will be illustrated and described hereinbelow with reference to FIGS. 8A-8K. Because additional and/or alternative information can be represented by the display data 128 and/or displayed on the display 126, it should be understood that the examples above are illustrative, and therefore should not be construed as being limiting in any way.

As shown in FIG. 1 and as mentioned above, some embodiments of the operating environment 100 can include the remote computer 120. As shown in FIG. 1, the remote computer 120 can be communicated with by the agent device 102 via one or more connections such as, for example, the network connection 104, though this is not the case in all embodiments. In some embodiments, some of the functionality illustrated and described herein with reference to the translation engine 110 can be offloaded to the remote computer 120, as noted above. For example, the remote computer 120 can be configured to obtain audio data 124 from the agent device 102 (e.g., via an audio stream or other streaming session) and/or one or more other sources, and the translation engine 110 can be executed and/or hosted by the remote computer 120 to perform the functionality illustrated and described herein at the remote computer 120 instead of, or in addition, performing such functionality at the agent device 102. It should be understood that this example embodiment is illustrative, and therefore should not be construed as being limiting in any way.

Now that the various components of the illustrative operating environment 100 shown in FIG. 1 have been introduced, additional aspects of the functionality of the interaction application 108 and translation engine 110 will be described in detail. According to various embodiments of the concepts and technologies disclosed herein, the interaction application 108 can be configured to orchestrate (locally and/or in conjunction with the remote computer 120) automatic translation of spoken human language during an interaction such as a conversation between two or more individuals such as, for example, a customer and an agent (e.g., an airline passenger and an airline agent). For ease of description, the embodiment of the interaction application 108 and translation engine 110 being executed by the agent device 102 will be described first and alternative embodiments where the agent device 102 offloads certain operations to the remote computer 120 will be explained in more detail below.

In various embodiments of the concepts and technologies disclosed herein, the interaction application 108 can be configured to support a setup operation and/or a training operation by which the interaction application 108 can be trained to recognize a user associated with the agent device 102, for example, an airline agent or other entity. The interaction application 108 can be configured to use the recognition of the agent, for example, to disambiguate speech of parties during a conversation or other interaction. For example, an ability of the interaction application 108 to recognize speech as being the agent's speech can be used by the interaction application 108 and/or the translation engine 110 to disambiguate speakers during conversations and/or other interactions (e.g., to recognize speech associated with the agent or other user in a conversation and/or to recognize speech not associated with the agent or other user in the conversation). It should be understood that this example embodiment is illustrative, and therefore should not be construed as being limiting in any way.

In some embodiments, the interaction application 108 can begin a setup operation or training operation. In some embodiments, the initiating of the setup operation or training operation can occur in response to an agent or other entity selecting an option to setup or train the interaction application 108. In some other embodiments, the initiating of the setup operation or training operation can be triggered automatically and/or programmatically when the interaction application 108 is started for the first time at the agent device 102. Because the setup operation or training operation can be performed at additional and/or alternative times, it should be understood that these example embodiments are illustrative, and therefore should not be construed as being limiting in any way.

In various embodiments of the setup operation or training operation, the interaction application 108 can be configured to obtain an instance of audio data 124. The audio data 124 captured during the setup operation or training operation can include, for example, spoken words or phrases spoken by the agent or other user. Such words can be prompted, for example, via visual prompts on the display 126 such as "please say 'elephant,'" "please say your name," "please say the following phrase 'good morning, can I help you?,'" other words or phrases, combinations thereof, or the like.

The interaction application 108 can be configured to record the agent or other user speaking various words or phrases, and the interaction application 108 can be configured to perform an audio analysis on the audio data 124. For example, the interaction application 108 can perform operations for analyzing audio for determining the pitch, rhythm, tone, timbre, and/or other audio qualities associated with the agent's voice as captured in the audio data 124 during the setup operation or training operation. Based on the operations, the interaction application 108 can be configured to generate a voiceprint for the agent ("agent voiceprint"). The agent voiceprint can include an individually unique pattern of various voice characteristics that have been determined to be associated with the agent. In various embodiments of the concepts and technologies disclosed herein, the sound hardware 122 can include a spectrograph or the like, which can identify the various characteristics of the voice used to generate the voiceprint. Because the voiceprint can be generated in additional and/or alternative manners (e.g., at the agent device 102, at other devices, or the like), it should be understood that this example embodiment is illustrative, and therefore should not be construed as being limiting in any way.

The interaction application 108 can be configured to associate the generated agent voiceprint with the agent or other user, and can store the agent voiceprint for future use, as will be explained in more detail hereinbelow. In some embodiments, the interaction application 108 also can determine a language associated with the agent or other user, and this information can be stored with the agent voiceprint and/or associated with the agent voiceprint. In some contemplated embodiments, the agent (as an employee of a particular airline) may be required (e.g., by the airline) to speak a particular language (e.g., English). As such, in some embodiments the agent voiceprint can include information indicating that the language of the agent is English (or other known language). As will be explained in more detail hereinbelow, knowledge of the agent's language can be used to disambiguate speech during a conversation or other interaction by recognizing speech in the agent's language as being associated with the agent. It should be understood that this example embodiment is illustrative, and therefore should not be construed as being limiting in any way.

The interaction application 108 can be configured in some embodiments to provide translation of speech during an interaction such as, for example, a conversation. In particular, the interaction application 108 can be invoked and/or triggered via detecting an interaction (e.g., a conversation between an agent and a customer), via a command from a user (e.g., an agent), via detecting an initiation of the interaction application 108, and/or other events. In some embodiments, the interaction application 108 can be configured to activate the sound hardware 122 to capture audio data 124 associated with the interaction without agent or customer input. As such, it can be appreciated that based on detecting the beginning of an interaction, the interaction application 108 can be configured to automatically capture audio data 124 associated with the interaction and to automatically identify languages being spoken and to translate between the languages without additional input by the agent and/or customer. It should be understood that this example embodiment is illustrative, and therefore should not be construed as being limiting in any way.

The interaction application 108 can be configured to analyze the audio data 124 and/or to provide the audio data 124 to the translation engine 110 for analysis to determine the speaking parties, to identify languages being spoken, and to provide translation between the identified languages. Because the translation engine 110 can be locally executed (e.g., executed by the agent device 102) and/or remotely executed (e.g., by the remote computer 120), it can be appreciated that the agent device 102 can be configured to transmit the audio data 124 to other devices in some embodiments. Via the analysis of the speech by the interaction application 108 (or in some embodiments the translation engine 110), the interaction application 108 can detect speech represented by the audio data 124.

In particular, the interaction application 108 can be configured in some embodiments to identify a speaker associated with the detected speech. In some embodiments, the interaction application 108 can be configured to identify the speaker as the agent and/or to identify the speaker as either not being the agent or as being the customer. In some embodiments, the interaction application 108 can identify the speaker by determining if an agent voiceprint is stored and/or available. If an agent voiceprint is stored and/or available, a voiceprint associated with the detected speech (also referred to herein as a speech voiceprint) can be generated based on the audio data 124 in a manner similar to that set forth above with regard to the agent voiceprint. The speech voiceprint can be compared to the agent voiceprint. If the voiceprints match (to a defined level of certainty such as, for example, a ninety-five percent certainty or the like), the interaction application 108 can identify the speaker as being the agent. If the interaction application 108 determines that the speech voiceprint and the agent voiceprint do not match to a defined level, the interaction application 108 can identify the speaker as the customer. It should be understood that this example embodiment is illustrative, and therefore should not be construed as being limiting in any way.

In some other embodiments, the interaction application 108 can be configured to identify the speaker based on language in addition to, or instead of, using voiceprints. For example, the interaction application 108 can be configured to determine a language associated with the detected speech (e.g., automatically when the speech is detected, or in cases in which no agent voiceprint is stored) and to use the knowledge of the language to associate the language with the agent or with the customer. In particular, the interaction application 108 can analyze the speech (e.g., by the translation engine 110 as will be explained in more detail below) to determine a language being spoken in the detected speech. If the detected speech is determined to be in English or in another language that is known to be associated with the agent, the interaction application 108 can be configured to identify the speaker as the agent. Alternatively, if the detected speech is not determined to be in English or in another language known to be associated with the agent, and/or if the detected speech is determined to be in a language other than a language known to be spoken by the agent, the interaction application 108 can be configured to identify the speaker as the customer. Because the speaker identity can be determined in additional and/or alterative manners, it should be understood that the above example embodiments are illustrative, and therefore should not be construed as being limiting in any way.

The interaction application 108 can be configured to output and/or use the speaker identity determined in these and/or other manners. If the interaction application 108 determines that the detected language is associated with the agent, the interaction application 108 can determine if the language spoken by the customer is known. If not, the interaction application 108 can continue capturing audio data 124 and analyzing speech until speech not associated with the agent is detected, and a customer language can be determined for the speech. Once the language of the agent and the language of the customer are determined, the interaction application 108 (and/or the translation engine 110, e.g., via execution of the translation module 114) can be configured to translate the agent's speech to the customer's language and the customer's speech to the agent's language. The translations can be transcribed into written text and output on the display 126. The interaction application 108 can be configured to determine if the interaction has ended. If the interaction has not ended, the translation can continue until the interaction ends.

Similarly, or alternatively, if the interaction application 108 determines that the detected language is associated with the customer, the interaction application 108 can determine if the language spoken by the customer is known. If not, the interaction application 108 (and/or the language identification module 112) can analyze the speech and determine a language being spoken (e.g., the customer language). The interaction application 108 (and/or the translation engine 110, e.g., via execution of the translation module 114) can then translate the customer's speech to the agent's language. The translation can be transcribed into written text and output on the display 126. The interaction application 108 can be configured to determine if the interaction has ended. If the interaction has not ended, the translation can continue until the interaction ends.

As noted above, the interaction application 108 can include the functionality illustrated and described herein for the translation engine 110 in some embodiments, or the translation engine 110 can be invoked by the interaction application 108 at various times. In any event, the interaction application 108 can determine or identify the customer's language and store the determined or identified language for the duration of an interaction between the agent and the customer. Thus, the interaction application 108 can be relieved of being required to determine languages more than once in a single conversation, in various embodiments. In some embodiments, the translation engine 110 can include the language identification module 112 as explained above. The interaction application 108 can provide audio associated with the customer's speech to the language identification module 112 and the language identification module 112 can provide, to the interaction application 108, an identification of the language or a language listing (e.g., a ranked language listing as will be explained in more detail below) that can identify more than one language. The interaction application 108 can determine, based on the response form the language identification module 112, if more than one language has been determined to be possible for the customer speech.

If more than one language has been determined to be possible for the customer speech, the interaction application 108 can generate and output display data 128 for showing the multiple languages to the customer and/or enabling a language selection by the customer from the listing. Once a language selection has been made, or in the event that only one language is determined to be possible for the speech, the interaction application 108 can set and/or store the language for the customer for the duration of the interaction. It should be understood that this example embodiment is illustrative, and therefore should not be construed as being limiting in any way.

The language identification module 112 can be configured in some embodiments to output language information such as an indication of a language being spoken. Similarly, the language identification module 112 can be configured to output language information that can include a ranked language listing, which can be generated by the language identification module 112 if more than one language is determined to be a possible match for detected speech. In particular, the language identification module 112 can access and/or determine language likelihood thresholds that have been defined for the language identification module 112. The language likelihood thresholds can define a likelihood, confidence, or certainty required to set a single language for an interaction.

In some embodiments, the language likelihood threshold can be set at a defined certainty, confidence, probability, or the like. For example, in some embodiments the language likelihood threshold can be set at a probability of 0.70 (i.e., a probability that speech is in a particular language), and a maximum of five possible languages can be accommodated in a ranked language listing in some embodiments. Because the language likelihood thresholds can be defined as other probabilities and/or combined probabilities, and because more than five languages can be accommodated in some embodiments of the concepts and technologies disclosed herein, it should be understood that this example embodiment is illustrative and therefore should not be construed as being limiting in any way.

The language identification module 112 can analyze the speech and determine, based on the language likelihood thresholds, one or more language(s) that meet or exceed the language likelihood thresholds. In particular, if a probability of 0.70 is required to set the language, any language identified with a confidence or probability that meets or exceeds 0.70 can be defined as the only possible language and a ranked language listing may not be generated by the language identification module 112 (e.g., the language identification module 112 may instead output language information identifying the single language). Alternatively, if a highest-probability language does not exceed a probability of 0.70 (or other defined confidence or certainty), the language identification module 112 can be configured to output a ranked language listing that can include two or more languages ranked in order of probability or certainty. In some embodiments, a combined probability threshold (e.g., 0.60, 0.70, 0.80, 0.90, 0.95, or other value) and/or a maximum number of possible languages (e.g., 2, 3, 4, 5, or other value) can be defined to limit the size of the ranked language listing, though this is not necessarily the case. It should be understood that this example embodiment is illustrative, and therefore should not be construed as being limiting in any way.

In some embodiments, the language identification module 112 can add possible languages to the ranked language listing until a combined probability meets or exceeds a defined threshold and/or until a maximum number of languages have been identified. The language identification module 112 can output the ranked language listing to the interaction application 108, and the agent device 102 can output, e.g., on the display 126, the ranked language listing to enable a customer or other entity to select their language from the ranked language listing. It should be understood that this example embodiment is illustrative, and therefore should not be construed as being limiting in any way.

In some embodiments, the translation engine 110 can include a context module 116, which can be used to disambiguate ambiguous phrases and/or words, to make suggestions to the agent device 102, and/or for other purposes as will be explained in more detail below. The context module 116 can be configured to perform disambiguation of words or phrases in speech and/or to provide information that can be used by the interaction application 108 to disambiguate words or phrases in speech. In some embodiments, the information provided by the context module 116 can be used by the interaction application 108 to disambiguate various language translation operations, language identification operations, or the like. For example, the context module 116 can be configured to determine, at any time such as, the beginning of an interaction, various instances of contextual information that may be used by the interaction application 108.

For example, the contextual information can include a determination as to what gate the agent device 102 is located, a status associated with the flight or aircraft located at the gate at which the agent device 102 is located (e.g., is the plane loading, is the plane unloading, or the like). The contextual information also can include, for example, an origin associated with the flight or aircraft located at the gate at which the agent device 102 is located, a destination associated with the flight or aircraft located at the gate at which the agent device 102 is located, a geographic location associated with the gate at which the agent device 102, aircraft, or gate is or are located, or the like. It can be appreciated that the contextual information such as the origin, destination, and/or geographic location can be used to determine (or help determine) a language that may or may not be relevant and/or the order in which such languages may be considered.

Furthermore, if context revels that a flight has recently arrived from overseas, this context can be used to disambiguate words or phrases detected during a conversation (e.g., the word "connection" may be construed as a hardware interface in some instances, a next flight in an itinerary, or the like based on context). Similarly, if a flight has been cancelled or delayed due to weather, certain speech may be disambiguated based on this information. Because various types of contextual information are possible and are contemplated, it should be understood that these example embodiments are illustrative, and therefore should not be construed as being limiting in any way.

In one example of using context to disambiguate the identification of languages, a flight may have recently arrived at the Hartsfield-Jackson International Airport in Atlanta (ATL) from Ben Gurion Airport in Lod, Israel (TLV). This contextual information can reflect the status of the flight (landed), the origin (Israel), and the current location (e.g., the destination—the United States). Based on these and/or other contextual data, the interaction application 108 may determine that the most likely languages being spoken are English, Hebrew, and Arabic because these three languages are the most commonly spoken languages at the origin airport and/or the destination airport. It should be understood that this example embodiment is illustrative, and therefore should not be construed as being limiting in any way.

As such, it can be appreciated that the context module 116 can be configured to obtain various contextual data from various devices and/or entities such as flight tracking services, flight scheduling information, gate assignment information, other information, combinations thereof, or the like. Thus, the interaction application 108 can be configured to obtain the contextual information from the context module 116 and/or to use the contextual information as part of providing the translation and language identification operations illustrated and described herein. It should be understood that this example embodiment is illustrative, and therefore should not be construed as being limiting in any way.

As explained briefly above, some embodiments of the concepts and technologies disclosed herein can be provided by the agent device 102 cooperating with one or more other devices (e.g., the remote computer 120 shown in FIG. 1). The interaction application 108 can be executed at the agent device 102 and can be configured to collect the audio data 124 and to provide the audio data 124 to the remote computer 120 for the performance of the operations illustrated and described herein for identifying languages, translating languages, and the like. The remote computer 120 can execute and/or host the translation engine 110, and the translation engine 110 can analyze the audio data 124 to determine the languages (e.g., using the language identification module 112), to translate speech to other languages (e.g., using the translation module 114), to use context to perform these and/or other operations illustrated and described herein (e.g., using the context module 116), and/or to create and/or maintain libraries 118. The libraries 118 can include, for example, one or more voiceprints, one or more languages (e.g., dictionaries, grammar rules and/or information, etc.), one or more histories (e.g., interaction histories and/or interaction transcripts, or the like), combinations thereof, or the like.

In various embodiments, the translation engine 110 can be configured to generate one or more instances or releases of interaction data 130. The interaction data 130 can include, for example, one or more instances of display data 128, one or more ranked language listings, one or more libraries 118, and/or other information. Thus, it can be appreciated that according to various embodiments of the concepts and technologies disclosed herein, the functionality illustrated and described herein with regard to the translation engine 110 can be performed at the agent device 102 and/or remote from the agent device 102 (e.g., at the remote computer 120). It should be understood that this example embodiment is illustrative, and therefore should not be construed as being limiting in any way.

Although the above description has explained the functions of the interaction application 108 and the translation engine 110 (e.g., including the language identification module 112, the translation module 114, and the context module 116) as being performed by separate applications, it should be understood that this is not necessarily the case in all embodiments. In particular, the interaction application 108 can include the functionality illustrated and described herein with reference to the translation engine 110. As such, it can be appreciated that the interaction application 108 can include the functionality of the translation engine 110 in various embodiments. It should be understood that this example embodiment is illustrative, and therefore should not be construed as being limiting in any way.

In practice, an airline passenger ("customer") may approach and/or otherwise speak to an airline employee or agent ("agent") such as a flight attendant, a gate agent, a ticketing agent, or the like. The agent, for example upon realizing that the customer is speaking a foreign language of having difficulty expressing his or her concern in the agent's language, can activate the interaction application 108 to provide translation. The agent can communicate to the customer (e.g., using a text notice on the agent device 102 or the like) that he or she should speak in their native language so the agent device 102 can begin providing translations. It should be understood that this example embodiment is illustrative, and therefore should not be construed as being limiting in any way.

According to various embodiments of the concepts and technologies disclosed herein, the customer may speak to the agent in a language that is not fluently spoken by the agent. By way of example, the agent may fluently speak English and Spanish, while the customer may fluently speak Korean and may not be well-versed in English or Spanish. As a result, the agent may not be able to clearly understand a question or concern of the customer in the customer's native language. Furthermore, the agent may be unaware of what language the customer is speaking and identifying the language in English may not be possible for the customer (e.g., selecting a language from an interface). Embodiments of the concepts and technologies disclosed herein can provide automated translation during a conversation as illustrated and described herein.

In particular, the agent may have at his or her disposal an agent device 102 that can include, for example, a handheld computing device such as a SkyPro® brand device, a desktop computer, a handheld tablet device, or the like. Embodiments of the agent device 102 illustrated and described herein can be configured to execute an interaction application 108, which can be configured to orchestrate and manage translation of the customer's speech and the agent's speech during the conversation. The interaction application 108 can be configured to include and/or to access a locally or remotely executed translation engine 110. The translation engine 110 can include a language identification module 112, a translation module 114, and/or a context module 116. It should be understood that this example embodiment is illustrative, and therefore should not be construed as being limiting in any way.

The language identification module 112 can be configured to obtain audio data 124, which can be captured in some embodiments by sound hardware 122 that can be in communication with and/or can be a component of the agent device 102. The language identification module 112 can be configured to analyze the audio data 124 to recognize spoken words and to identify a language being spoken. In various embodiments of the concepts and technologies disclosed herein, the language identification module 112 can be configured to determine the language being spoken in realtime and/or near-realtime, though this is not necessarily the case in all embodiments.

The language identification module 112 can be configured, in some embodiments, to determine the language by recognizing words (e.g., by recognizing pauses, based on intonation, or the like) and by either identifying words in a particular language or attempting to translate the words into any number of languages and determining, based on the output translations, what language is being spoken, what language is most likely being spoken, and/or what languages are likely being spoken. Because the language can be determined in additional and/or alternative manners, it should be understood that this example embodiment is illustrative, and therefore should not be construed as being limiting in any way.

In some embodiments, the agent device 102 can be configured (e.g., via execution of the interaction application 108 and/or one or more components of the translation engine 110) to recognize spoken language by the agent based on a stored voiceprint (e.g., trained or captured by the interaction application 108) that can be compared to a speech voiceprint (a voiceprint generated for captured speech). In some embodiments, the agent device 102 can be configured (e.g., via execution of the interaction application 108 and/or one or more components of the translation engine 110) to recognize spoken language by the agent based on a language being spoken (e.g., if the agent is known to speak English and the captured speech is in English, the speech can be determined to be associated with the agent). It should be understood that this example embodiment is illustrative, and therefore should not be construed as being limiting in any way.

In some embodiments, the language identification module 112 can output language information that identifies one language and/or two or more languages that can be ordered based on probability or other likelihood measure of being the language being spoken by the customer. The interaction application 108 and/or the translation engine 110 can generate display data 128 that, when rendered by the agent device 102, can present the language and/or the list of languages, enable selection of a language (from two or more) and/or enable changing of the language. Once the language of the customer is determined and/or confirmed, the agent device 102 can set the customer language for the duration of the interaction (e.g., the conversation).

Once the customer language and the agent language are known, the agent device 102 can be configured (e.g., via execution of the interaction application 108 and/or one or more components of the translation engine 110 such as the translation module 114) to translate the speech associated with the conversation automatically. As used herein, "automatic translation" and/or "automatically translating" or variants thereof are used to refer to the agent device 102 or other device providing translation without requiring an agent or customer to indicate when their speech begins and ends, without requiring an agent or customer to select or change a language selection, without requiring prompts for a customer or agent to speak or stop speaking, without requiring a change in orientation of the agent device 102, and/or the like. It should be understood that this example embodiment is illustrative, and therefore should not be construed as being limiting in any way.

In some embodiments, the translation is in realtime and/or in near-realtime, though this is not necessarily the case in all embodiments. The agent device 102 can be configured (e.g., via execution of the interaction application 108 and/or one or more components of the translation engine 110) to generate additional instances of display data 128. The display data 128 can include data that, when rendered by the agent device 102, can cause the agent device 102 to present the translations of the customer speech in the agent's language oriented such that the agent can read the translation while holding or viewing the agent device 102 in its standard orientation (e.g., the orientation in which the agent device 102 is held or viewed when used by the agent for other tasks).

Similarly, the display data 128 can include data that, when rendered by the agent device 102, can cause the agent device 102 to present the translations of the agent's speech in the customer's language oriented such that the customer can read the translation while the agent continues holding or viewing the agent device 102 in its standard orientation (e.g., the orientation in which the agent device 102 is held or viewed when used by the agent for other tasks). Thus, the text associated with the translation of the customer speech in the agent's language may be in the normal orientation for the agent, while the text associated with the translation of the agent's speech in the customer's language may be upside down for the agent (but viewable by the customer without reorienting or repositioning the agent device 102). It should be understood that this example embodiment is illustrative, and therefore should not be construed as being limiting in any way.

As such, it can be appreciated from the above description that embodiments of the concepts and technologies disclosed herein can enable the agent to communicate with the customer notwithstanding different native languages. This can enable the agent to provide the customer with service notwithstanding a language barrier as mentioned above. This, in turn, can improve the customer service and enable an agent to communicate with the customer in a seamless and efficient manner. It should be understood that this example embodiment is illustrative, and therefore should not be construed as being limiting in any way.

FIG. 1 illustrates one agent device 102, one network connection 104, and one remote computer 120. It should be understood, however, that various implementations of the operating environment 100 can include one or more than one agent device 102, zero, one, or more than one network connection 104, and/or zero, one, or more than one remote computer 120. As such, the illustrated embodiment should be understood as being illustrative, and should not be construed as being limiting in any way.

Figure 2:
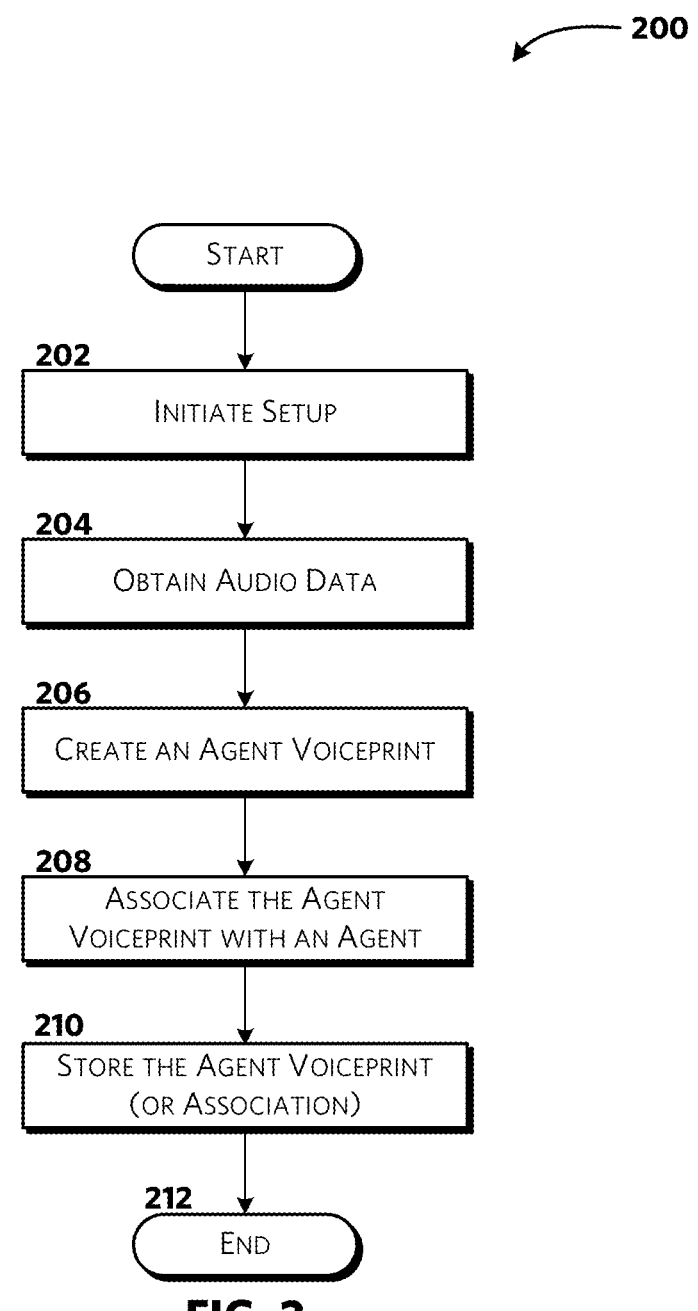
FIG. 2 is a flow diagram showing aspects of a method for training an interaction application to recognize an agent, according to an illustrative embodiment of the concepts and technologies described herein.

Turning now to FIG. 2, aspects of a method 200 for training an interaction application 108 to recognize an agent will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations that can include single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the agent device 102 and/or the remote computer 120, to perform one or more operations and/or causing the processor to direct other components of the computing system or device to perform one or more of the operations.

For purposes of illustrating and describing the concepts of the present disclosure, the method 200 is described herein as being performed by the agent device 102 via execution of one or more software modules such as, for example, the interaction application 108, the translation engine 110, and/or one or more components thereof. It should be understood that additional and/or alternative devices and/or resources can provide the functionality described herein via execution of one or more modules, applications, and/or other software that can include, but are not limited to, the interaction application 108 and/or the translation engine 110. Thus, the illustrated embodiments are illustrative, and should not be viewed as being limiting in any way.

The method 200 begins at operation 202. At operation 202, the agent device 102 can initiate a setup operation. As noted above, the setup operation can include a training operation and/or setup operation, for example, to configure various settings and/or options for the interaction application 108, to learn or train the interaction application 108 to recognize the agent or other user, and/or for other purposes. For example, the interaction application 108 can be configured to support a training operation or a setup operation to configure the agent device 102 to recognize a user associated with the agent device 102, for example, an airline agent or other entity. It should be understood that this example embodiment is illustrative, and therefore should not be construed as being limiting in any way.

The interaction application 108 can be configured to use the recognition of the agent, for example, during an interaction such as a conversation. In particular, as noted above, the interaction application 108 can be configured to recognize speech of a particular user or agent to disambiguate speech associated with multiple speakers during the interaction (e.g., to recognize particular speech as being associated with the agent or other user in a conversation and/or to recognize speech as not being associated with the agent or other user in the conversation). It should be understood that this example embodiment is illustrative, and therefore should not be construed as being limiting in any way.

In operation 202, the agent device 102 (e.g., via execution of the interaction application 108) can initiate or trigger the setup operation or training operation. In some embodiments, operation 202 can include an agent or other entity selecting an option to setup or train the interaction application 108, detecting that the interaction application 108 is being started for a first time at the agent device 102, detecting that the interaction application 108 is being started for a first time in association with use of the agent device 102 by a particular agent or other user, and/or other triggers or events that can be performed at additional and/or alternative times. It should be understood that the above example embodiments are illustrative, and therefore should not be construed as being limiting in any way.

From operation 202, the method 200 can proceed to operation 204. At operation 204, the agent device 102 can obtain audio data 124. It can be appreciated that multiple instances of audio data 124 can be captured in association with various operations illustrated and described herein. As such, in operation 204, it can be appreciated that an instance of audio data 124 can be obtained. As explained above, the audio data 124 obtained in operation 204 can be associated with the setup and/or training operations and can include speech associated with an agent or other user associated with the agent device 102. The audio data 124 can be obtained by the agent device 102 using a microphone or the like, in some embodiments.

In some embodiments, operation 204 can include the agent device 102 obtaining the audio data 124 (e.g., via execution of the interaction application 108) during speech of the agent or other user, the speech that can include spoken words that may be prompted or directed by the agent device 102. For example, the agent device 102 may be configured to provide visual prompts on the display 126 such as instructions for the agent or other user to say specific words or phrases, or the like. Because the voice of the agent or other user can be captured at additional and/or alternative times and/or in additional and/or alternative scenarios, it should be understood that these embodiments are illustrative, and therefore should not be construed as being limiting in any way.

From operation 204, the method 200 can proceed to operation 206. At operation 206, the agent device 102 can create an agent voiceprint (e.g., an agent associated with a voice of the agent or other user. In various embodiments of operation 206, the agent device 102 can perform an audio analysis on the audio data 124 obtained in operation 204. It should be understood that in some embodiments, the generation of the agent voiceprint can be offloaded by the agent device 102. For example, the agent device 102 can be configured to upload samples of the agent's voice to one or more other devices for generation of the agent voiceprint, while in some other embodiments (such as the embodiment shown in FIG. 2), the agent device 102 can be configured to generate the agent voiceprint using the interaction application 108. It should be understood that this example embodiment is illustrative, and therefore should not be construed as being limiting in any way.

In operation 206, the agent device 102 (e.g., via execution of the interaction application 108) can be configured to determine a frequency of the voice (e.g., the "pitch" of the voice and/or pitches of various sound waves associated with the voice), a rhythm and/or rate at which words are said and/or an intonation of the voice (e.g., the "tone" of the voice), the timbre of the voice (e.g., that can include the quality of the voice and/or resonance associated with the voice), and/or other audio qualities associated with the voice. Based on these and/or other analysis and/or determinations, the interaction application 108 can generate an agent voiceprint, where the agent voiceprint can include an individually unique pattern of various voice characteristics for the agent that can be used to identify a speaker as being (or not being) the agent based on the agent voiceprint. It should be understood that this example embodiment is illustrative, and therefore should not be construed as being limiting in any way.

From operation 206, the method 200 can proceed to operation 208. At operation 208, the agent device 102 can associate the agent voiceprint created in operation 206 (e.g., via execution of the interaction application 108) with the agent or other user, and can store the agent voiceprint for future use. In some embodiments, the interaction application 108 also can determine a language associated with the agent or other user, and this information can be stored with the agent voiceprint and/or can be associated with the agent voiceprint. In some contemplated embodiments, for example, agents of a particular airline may be required to speak English and this information can be stored with and/or as a part of the agent voiceprint in some embodiments. It should be understood that this example embodiment is illustrative, and therefore should not be construed as being limiting in any way.

From operation 208, the method 200 can proceed to operation 210. At operation 210, the agent device 102 can store the agent voiceprint and/or can store a data association that associates the generated agent voiceprint with the agent (or other user). In some embodiments, the agent voiceprint can be stored by the agent device 102 in one or more libraries 118, though this is not necessarily the case in all embodiments. As explained above, the agent voiceprint can be used to determine if speech detected by the agent device 102 is associated with the agent or another entity (e.g., by comparing the speech voiceprint associated with the detected speech with the agent voiceprint). Because the agent voiceprint can be used for additional and/or alternative purposes, it should be understood that the example use is illustrative, and therefore should not be construed as being limiting in any way.

From operation 210, the method 200 can proceed to operation 212. The method 200 can end at operation 212.

Figure 3:
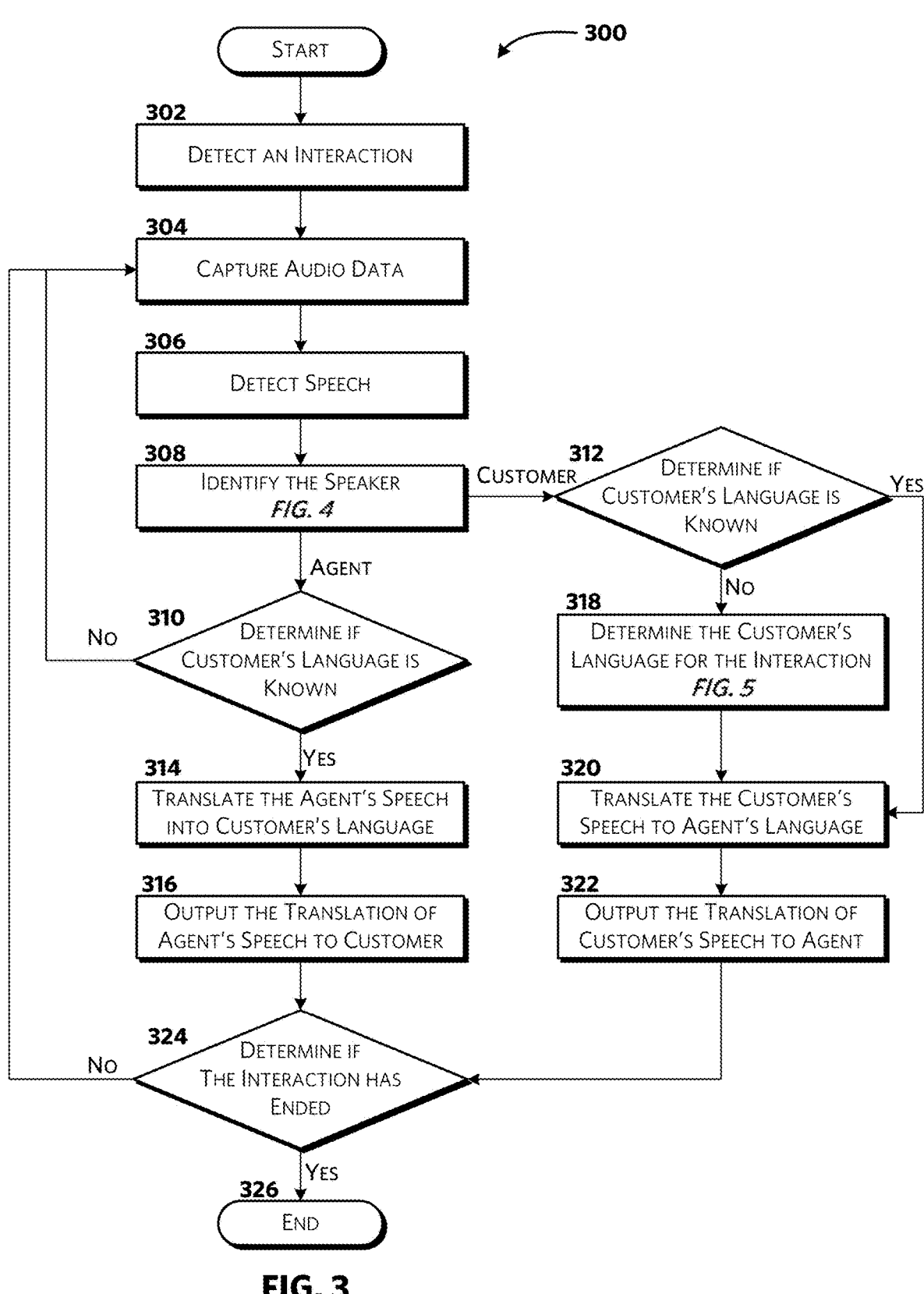
FIG. 3 is a flow diagram showing aspects of a method for translating speech during an interaction using an interaction application, according to an illustrative embodiment of the concepts and technologies described herein.

Turning now to FIG. 3, aspects of a method 300 for translating speech during an interaction using an interaction application 108 will be described in detail, according to an illustrative embodiment. For purposes of illustrating and describing the concepts of the present disclosure, the method 300 is described herein as being performed by the agent device 102 via execution of one or more software modules such as, for example, the interaction application 108 and/or the translation engine 110. It should be understood that additional and/or alternative devices and/or resources can provide the functionality described herein via execution of one or more modules, applications, and/or other software that can include, but are not limited to, the interaction application 108, the translation engine 110, and/or components thereof. Thus, the illustrated embodiments are illustrative, and should not be viewed as being limiting in any way.

The method 300 begins at operation 302. At operation 302, the agent device 102 can detect an interaction. The interaction detected in operation 302 can include, for example, a conversation between an airline agent (e.g., an agent) and an airline passenger (e.g., a customer), where this conversation may be one for which translation is desired and/or desirable. It should be understood that this example embodiment is illustrative, and therefore should not be construed as being limiting in any way.

According to some embodiments, the agent device 102 can be configured (e.g., via execution of the interaction application 108) to detect the interaction by detecting receipt of a command from a user (e.g., by the agent device 102 detecting selection of an option to begin translating a conversation). According to some other embodiments, the agent device 102 can detect the interaction by detecting an initiation of the interaction application 108 at the agent device 102 (e.g., the interaction application 108 can be configured to assume a new conversation has begun when the interaction application 108 is started or loaded at the agent device 102). Because the agent device 102 can detect the interaction in additional and/or alternative manners, it should be understood that these example embodiments are illustrative, and therefore should not be construed as being limiting in any way.

From operation 302, the method 300 can proceed to operation 304. At operation 304, the agent device 102 can capture audio data 124. As noted above, multiple instances of audio data 124 can be captured in association with various operations illustrated and described herein. As such it can be appreciated that in operation 304 an instance of audio data 124 can be obtained by the agent device 102. In some embodiments, operation 304 can be performed in response to the agent device 102 detecting the beginning of an interaction. In particular, the agent device 102 can be configured (e.g., via execution of the interaction application 108) to begin capturing audio data 124 associated with the interaction (e.g., the conversation for which translation has been requested). The agent device 102 can be configured to activate (or to trigger activation of) the sound hardware 122 to capture audio data 124 associated with the interaction.

The audio data 124 can include audio associated with the interaction (e.g., recorded by a microphone), audio signals associated with the interaction (e.g., captured by a sound sensor), other types of audio information, combinations thereof, or the like. The audio data 124 captured in operation 304 can be stored by the agent device 102 in a buffer, a cache, a memory, or another data storage device associated with the agent device 102 and/or accessible to the agent device 102; streamed to other storage or processing devices by the agent device 102; and/or otherwise stored for future use. It should be understood that this example embodiment is illustrative, and therefore should not be construed as being limiting in any way.

From operation 304, the method 300 can proceed to operation 306. At operation 306, the agent device 102 can detect speech in the audio data 124 captured in operation 304. In particular, the agent device 102 can be configured (e.g., via execution of the interaction application 108) to analyze the audio data 124 to recognize spoken words in the audio data 124. In various embodiments, the agent device 102 can detect the speech based on detected frequencies, based on breaks in sound (e.g., pauses between words or sentences), based on a resonance of the sounds heard and/or overlapping frequencies, based on speech recognition operations, and/or based on other types of analysis. Because speech can be detected at additional and/or alternative times and/or in additional and/or alternative manners, it should be understood that this example embodiment is illustrative, and therefore should not be construed as being limiting in any way.

From operation 306, the method 300 can proceed to operation 308. At operation 308, the agent device 102 can identify the speaker associated with the speech detected in operation 306. In particular, the agent device 102 can be configured (e.g., via execution of the interaction application 108 and/or the translation engine 110) to identify the speaker (associated with the speech detected in operation 306) as being the agent or a customer. It should be understood that while the agent device 102 may know the identity of the agent, the agent device 102 may not know the identity of the customer (or other entity), but can determine that the second party to the conversation is not the agent (and therefore is assumed to be the customer). It should be understood that this example embodiment is illustrative, and therefore should not be construed as being limiting in any way.

According to some embodiments, the agent device 102 can identify the speaker in operation 308 by determining if a voiceprint associated with the agent (an "agent voiceprint") is stored at the agent device 102. If the agent device 102 determines that agent voiceprint is available, the agent device 102 can generate or trigger the generation of another voiceprint, i.e., a voiceprint associated with the speech detected in operation 306 (also referred to herein as a "speech voiceprint"). In some embodiments, the agent device 102 can generate the speech voiceprint based on the audio data 124 in a manner that may be similar to the manner illustrated and described above with reference to operation 206. It should be understood that this example embodiment is illustrative, and therefore should not be construed as being limiting in any way.

The agent device 102 can compare the speech voiceprint to the agent voiceprint and determine if the voiceprints match. In some embodiments the matching can be determined to a defined confidence level or certainty such as ninety percent certainty, ninety-five percent certainty, etc. If the agent voiceprint and the speech voiceprint are determined by the agent device 102 to match to the defined certainty, the agent device 102 can identify the speaker as the agent. If the agent device 102 determines that the speech voiceprint and the agent voiceprint do not match to the defined certainty, the interaction application 108 can identify the speaker as the customer. Because the speaker can be identified in additional and/or alternative manners, it should be understood that these example embodiments are illustrative, and therefore should not be construed as being limiting in any way.

In some other embodiments, for example, the agent device 102 can be configured (e.g., via execution of the interaction application 108 and/or the translation engine 110) to identify the speaker based on a language being spoken in addition to, or instead of, using an agent voiceprint. For example, the agent device 102 (or other device) can be configured to analyze the speech to determine a language being spoken in association with the speech detected at operation 306. If the agent device 102 determines that the speech detected at operation 306 is in the English language (or some other language that is known to be associated with the agent), the agent device 102 can be configured to identify the speaker as the agent. Additionally and/or alternatively, if the agent device 102 determines that the speech detected in operation 306 is not in the English language (or not in another language that is known to be associated with the agent) and/or is otherwise determined to be in a language other than the agent's language, the agent device 102 can be configured to identify the speaker as the customer. It should be understood that this example embodiment is illustrative, and therefore should not be construed as being limiting in any way. Additional details of identifying the speaker will be illustrated and described in more detail below with reference to FIG. 4.

If the agent device 102 determines in operation 308 that the speaker identified in operation 308 is the agent, the method 300 can proceed to operation 310. In operation 310, the agent device 102 can determine if the customer's language ("customer language") is known. It can be appreciated that operation 310 can correspond to the agent device 102 determining if a customer language has been stored or set for the interaction (e.g., conversation) detected in operation 302. As explained above, embodiments of the concepts and technologies disclosed herein can detect the beginning of an interaction (e.g., conversation), determine languages being spoken during the conversation, set the languages for the respective parties, perform translation during the conversation, and upon detecting the end of the conversation, cease the translation. Thus, operation 310 can include the agent device 102 determining if the languages have been set for the interaction.

Alternatively, if the agent device 102 determines in operation 308 that the speaker identified in operation 308 is the customer, the method 300 can proceed to operation 312. At operation 312, the agent device 102 can determine if the customer's language is known. It can be appreciated that operations 310 and 312 can be substantially equivalent, with the differences being how and to where the method 300 flows after the respective determinations of operation 310 and 312. As such, the functionality of operation 312 will not be further described here, but the flow from operation 312 will be illustrated and described below after the flow from operation 310 is described.

Returning now to operation 310, if the agent device 102 determines in operation 310 that the customer language is not known (e.g., that the customer language has previously not been set and/or stored for the interaction detected in operation 302), the method 300 can return to operation 304, and the agent device 102 can again capture audio, detect speech, identify the speaker, etc. Thus, it can be appreciated that the agent device 102 can repeat operations 304-310 until the agent device 102 determines, in any interaction of operation 308, that the speech is associated with the customer, and/or until the agent device 102 determines, in any interaction of operation 310, that the customer language is known (e.g., that the customer language has previously been set and/or stored for the interaction).

If the agent device 102 determines, in operation 310, that the customer language is known, the method 300 can proceed to operation 314. At operation 314, the agent device 102 can translate the agent's speech (also referred to herein as "agent speech") into the customer's language. According to various embodiments of the concepts and technologies disclosed herein, the agent device 102 can pass the audio associated with the speech detected in operation 306 to the translation engine 110 (e.g., to the translation module 114), and the speech can be translated from the agent's language to the customer's language. It can be appreciated that the translation engine 110 can be executed at the agent device 102 and/or at a remote device (e.g., the remote computer 120). It can be appreciated that in some embodiments operation 314 can include the agent device 102 sending the audio data 124 to another device for translation and/or receiving a translation from the other device. As such, it should be understood that the described embodiment is illustrative and should not be construed as being limiting in any way.

From operation 314, the method 300 can proceed to operation 316. At operation 316, the agent device 102 can output the translation of the agent's speech to the customer (e.g., via the display 126 of the agent device 102). According to various embodiments of the concepts and technologies disclosed herein, the speech can be translated by the translation module 114 and the translation can be transcribed or otherwise converted to text. The text can be output by the translation engine 110 (or the interaction application 108) in the display data 128 for rendering by the agent device 102. Operation 316 also can include the agent device 102 rendering the display data 128 that can include the translation and displaying the rendered data on the display 126. As such, it can be appreciated that operation 316 can include outputting text, generating display data 128 that represents the text, and rendering and outputting the display data 128 to display the text on the display 126. It should be understood that this example embodiment is illustrative, and therefore should not be construed as being limiting in any way. The flow from operation 316 will be addressed below after first describing the flow from operation 312.

Returning now to operation 312, if the agent device 102 determines that the customer language is not known (e.g., that the customer language has not previously been set and/or stored for the interaction), the method 300 can proceed to operation 318. At operation 318, the agent device 102 can determine the customer's language for the interaction. Additional details of determining the customer's language for the interaction will be illustrated and described in more detail below with reference to FIG. 5. Briefly, however, the agent device 102 can provide audio (e.g., the audio data 124) to a language identification module 112 (locally or remotely executed) and receive an indication of the language of the customer. It should be understood that this example embodiment is illustrative, and therefore should not be construed as being limiting in any way.

If the agent device 102 instead determines, in operation 312, that the customer's language is known (e.g., that the customer language has previously been set and/or stored for the interaction), the method 300 can proceed to operation 320. In operation 320, the agent device 102 can translate the customer's speech to the agent's language. According to various embodiments of the concepts and technologies disclosed herein, the agent device 102 can pass the audio associated with the speech detected in operation 306 to the translation engine 110 (e.g., specifically to the translation module 114), and the speech can be translated from the customer's language to the agent's language. It can be appreciated that the translation engine 110 can be executed at the agent device 102 and/or at a remote device (e.g., the remote computer 120). As such, it should be understood that the described embodiment is illustrative and should not be construed as being limiting in any way.

From operation 320, the method 300 can proceed to operation 322. At operation 322, the agent device 102 can output the translation of the customer's speech to the agent (e.g., via the display 126 of the agent device 102). According to various embodiments of the concepts and technologies disclosed herein, the speech can be translated by the translation module 114 and the translation can be transcribed or otherwise converted to text. The text can be output by the translation engine 110 (or the interaction application 108) in the display data 128 for rendering by the agent device 102. Operation 322 also can include the agent device 102 rendering the display data 128 that can include the translation and displaying the rendered data on the display 126. As such, it can be appreciated that operation 322 can include outputting text (from the translation of the speech), generating display data 128 that represents the output text, and rendering and outputting the display data 128 to display the output text on the display 126. It should be understood that this example embodiment is illustrative, and therefore should not be construed as being limiting in any way.

From operation 322, the method 300 can proceed to operation 324. The method 300 also can proceed to operation 324 from operation 316. At operation 324, the agent device 102 can determine if the interaction (detected in operation 302) has ended. Thus, operation 324 can include determining if the conversation associated with the interaction has ended by detecting a command from the agent or other user to end the interaction, by detecting selection of an option to exit the interaction application 108 and/or to end the interaction, by detecting closing of the interaction application 108, or the like. Because an end of the interaction can be detected in additional and/or alternative manners, it should be understood that these example embodiments are illustrative, and therefore should not be construed as being limiting in any way.

If the agent device 102 determines, in operation 324, that the interaction has not ended, the method 300 can return to operation 304 and the agent device 102 can again capture audio data 124 associated with the interaction. It can be appreciated that the agent device 102 can provide the functionality of operations 304-324 until the agent device 102 determines, in any iteration of operation 324, that the interaction detected in operation 302 has ended. If the agent device 102 determines, in operation 324, that the interaction has ended, the method 300 can proceed to operation 326. The method 300 can end at operation 326.

Figure 4:
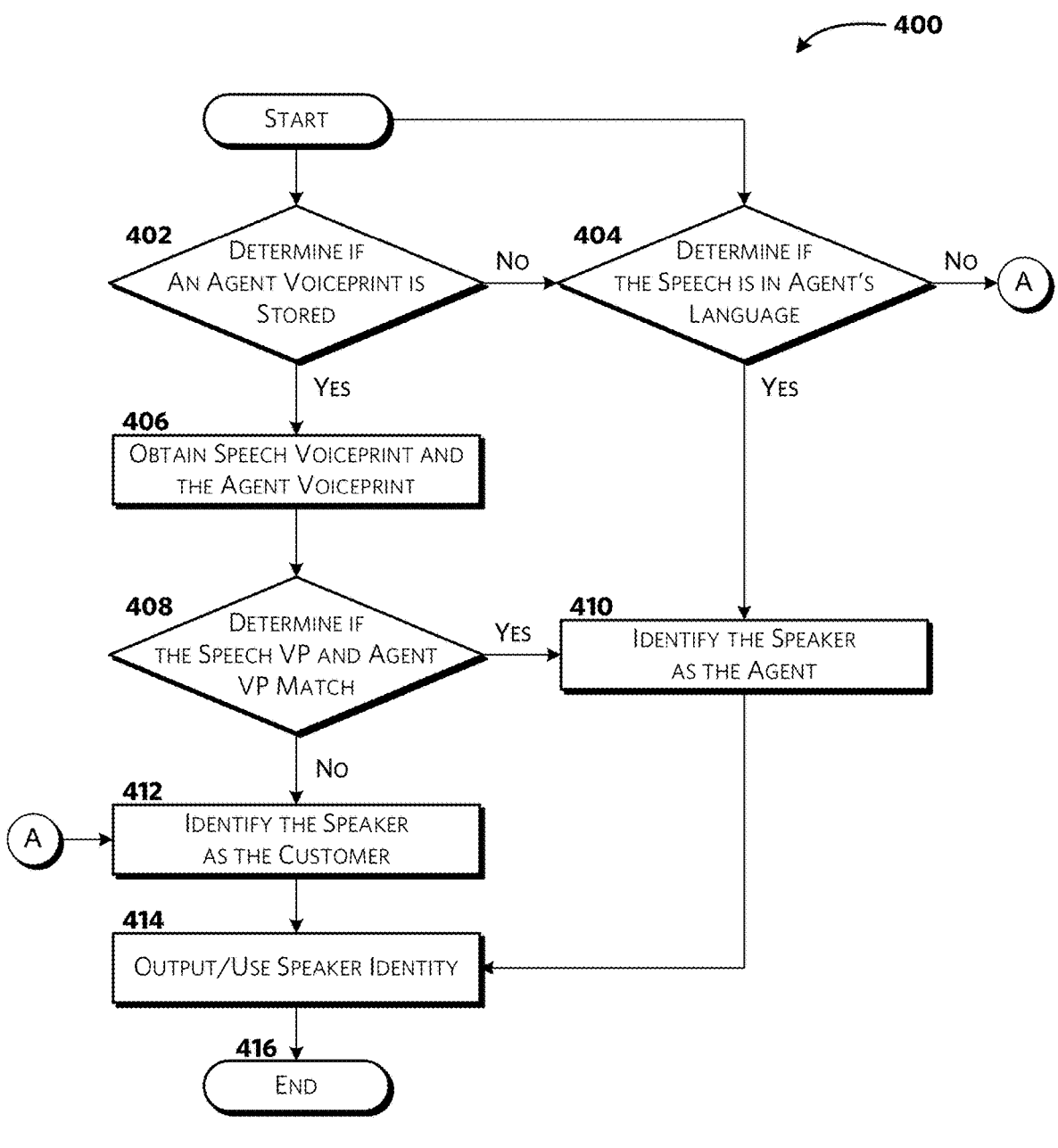
FIG. 4 is a flow diagram showing aspects of a method for identifying a speaker during an interaction, according to an illustrative embodiment of the concepts and technologies described herein.

Turning now to FIG. 4, aspects of a method 400 for identifying a speaker during an interaction will be described in detail, according to an illustrative embodiment. For purposes of illustrating and describing the concepts of the present disclosure, the method 400 is described herein as being performed by the agent device 102 via execution of one or more software modules such as, for example, the interaction application 108 and/or the translation engine 110. It should be understood that additional and/or alternative devices and/or resources can provide the functionality described herein via execution of one or more modules, applications, and/or other software that can include, but are not limited to, the interaction application 108 and/or the translation engine 110 (or one or more components thereof). Thus, the illustrated embodiments are illustrative, and should not be viewed as being limiting in any way.

According to various embodiments, the method 400 can begin and flow can proceed to operation 402 or operation 404. In some other embodiments, the method 400 can begin at operation 402 and optionally flow to operation 404 from operation 402. For purposes of simplifying the description of the method 400, the latter embodiment will be described, but it should be appreciated that the method 400 can begin at operation 404 as illustrated in FIG. 4. As such, it can be appreciated that in some embodiments the method 400 can omit operations 402-408 shown in FIG. 4.

At operation 402, the agent device 102 can determine if an agent voiceprint is stored. As explained above, the use of an agent voiceprint is optional in some embodiments and/or the method 400 may be performed before a setup or training operation has been performed, thereby resulting in there being no agent voiceprint. At any rate, in operation 402, the agent device 102 can determine if an agent voiceprint is stored (e.g., in the libraries 118 or elsewhere) and/or is accessible to the agent device 102.

If the agent device 102 determines, in operation 402, that the agent voiceprint is not stored, the method 400 can proceed to operation 404. If the agent device 102 determines, in operation 402, that the agent voiceprint is stored, the method 400 can proceed to operation 406. The functionality of the agent device 102 with regard to operation 404 will be described in more detail below after describing operation 406.

At operation 406, the agent device 102 can obtain a speech voiceprint (e.g., a voiceprint generated for the speech detected in operation 306 of the method 300 illustrated and described in FIG. 3) and the agent voiceprint can be stored by the agent device 102 (or elsewhere). Thus, although not separately illustrated in FIG. 4, it should be understood that the agent device 102 can generate a speech voiceprint for the detected speech in association with operation 406. The generation of the speech voiceprint in operation 406 can be substantially similar (or even identical) to the generation of the agent voiceprint as illustrated and described above with reference to operation 206 of the method 200 shown in FIG. 2, though this is not necessarily the case in all embodiments. As such, it can be appreciated that in operation 406, the agent device 102 can perform an audio analysis on the audio data 124 associated with the speech being analyzed in the method 400. For example, the agent device 102 can determine one or more frequencies associated with the speech, a rhythm and/or rate at which words are said in association with the speech, an intonation or tone of the speech, a timbre of the speech, and/or other audio qualities associated with the speech. The agent device 102 can generate a speech voiceprint that can include a unique pattern of various voice characteristics for the speech. Also, operation 406 can include the agent device 102 retrieving and/or otherwise obtaining the agent voiceprint from memory or another data storage device or resource.

From operation 406, the method 400 can flow to operation 408. At operation 408, the agent device 102 can determine if the speech voiceprint and the agent voiceprint obtained in operation 406 match one another and/or are similar enough to one another to justify a conclusion that the speech is being said by the agent. Thus, in operation 408 the agent device 102 can compare the voiceprints using audio analysis and/or data analysis to determine, for example, if one or more frequencies associated with the speech voiceprint and the agent voiceprint match one another and/or are similar enough to justify a conclusion that the speech is being said by the agent, if a rhythm and/or rate at which words are said in association with the speech voiceprint and the agent voiceprint match one another and/or are similar enough to justify a conclusion that the speech is being said by the agent, if an intonation or tone of the speech voiceprint and the agent voiceprint match one another and/or are similar enough to justify a conclusion that the speech is being said by the agent, if a timbre of the speech voiceprint and the agent voiceprint match one another and/or are similar enough to justify a conclusion that the speech is being said by the agent, and/or if other audio qualities associated with the speech voiceprint and the agent voiceprint match one another and/or are similar enough to justify a conclusion that the speech is being said by the agent. Because the determination as to whether the speech voiceprint and the agent voiceprint match can be performed in additional and/or alternative manners, it should be understood that this example embodiment is illustrative, and therefore should not be construed as being limiting in any way.

If the agent device 102 determines, in operation 408, that the speech voiceprint and the agent voiceprint match one another and/or are similar enough to justify a conclusion that the speech is being spoken by the agent, the method 400 can proceed to operation 410. If the agent device 102 determines, in operation 408, that the speech voiceprint and the agent voiceprint do not match one another and/or are not similar enough to justify a conclusion that the speech is being spoken by the agent, the method 400 can proceed to operation 412. Operations 410 and 412 will be described in more detail after describing operation 404.

Returning now to operation 404, at operation 404 the agent device 102 can determine if the speech (e.g., the speech detected in operation 306 of the method 300 illustrated and described in FIG. 3) is in the agent's language. According to various embodiments of the concepts and technologies disclosed herein, an agent of a particular airline may be required to speak a particular language such as English, and the knowledge of this may be used to disambiguate speech (e.g., to identify the speaker as being the agent or the customer). In some example embodiments, operation 404 can correspond to the agent device 102 determining if the speech (e.g., the speech detected in operation 306 of the method 300 shown in FIG. 3) is in English. It should be understood that this example embodiment is illustrative, and therefore should not be construed as being limiting in any way.

In various embodiments of the concepts and technologies disclosed herein, the determination of operation 404 can be performed by the agent device 102 passing the audio (e.g., the audio data 124) associated with the detected speech to the translation engine 110 to determine the language of the speech. Additional details of determining the language of the speech will be illustrated and described in more detail below with reference to FIG. 6, and in operation 404 the agent device 102 can obtain the determined speech and compare that to the agent's language and/or to English or another language spoken by the agent. Because the determination as to whether the speech is in the agent's language can be performed in additional and/or alternative manners, it should be understood that this example embodiment is illustrative, and therefore should not be construed as being limiting in any way.

If the agent device 102 determines, in operation 404, that the speech is in the agent's language, the method 400 can proceed to operation 410. The method 400 also can proceed to operation 410 from operation 408 if the agent device 102 determines, in operation 408, that the speech voiceprint and the agent voiceprint match one another and/or are similar enough to justify a conclusion that the speech is being said by the agent. At operation 410, the agent device 102 can identify the speaker associated with the speech as the agent.

Returning now to operation 408, if the agent device 102 determines, in operation 408, that the speech voiceprint and the agent voiceprint do not match one another and/or are not similar enough to justify a conclusion that the speech is being said by the agent, the method 400 can proceed to operation 412. The method 400 also can proceed to operation 412 from operation 404 if the agent device 102 determines, in operation 404, that the speech (e.g., the speech detected in operation 306 of the method 300 illustrated and described in FIG. 3) is not in the agent's language. In operation 412, the agent device 102 can identify the speaker of the speech (e.g., the speech detected in operation 306 of the method 300 illustrated and described in FIG. 3) as being the customer.

From operation 412, the method 400 can proceed to operation 414. The method 400 also can proceed to operation 414 from operation 410. At operation 414, the agent device 102 can output and/or use the speaker identity identified in operation 410 or 412. Thus, in operation 414, the agent device 102 can output the identity of the speaker associated with the speech (e.g., the decision of operation 308 of FIG. 3 can be completed using this determination). It should be understood that this example embodiment is illustrative, and therefore should not be construed as being limiting in any way.

From operation 414, the method 400 can proceed to operation 416. The method 400 can end at operation 416.

Figure 5:
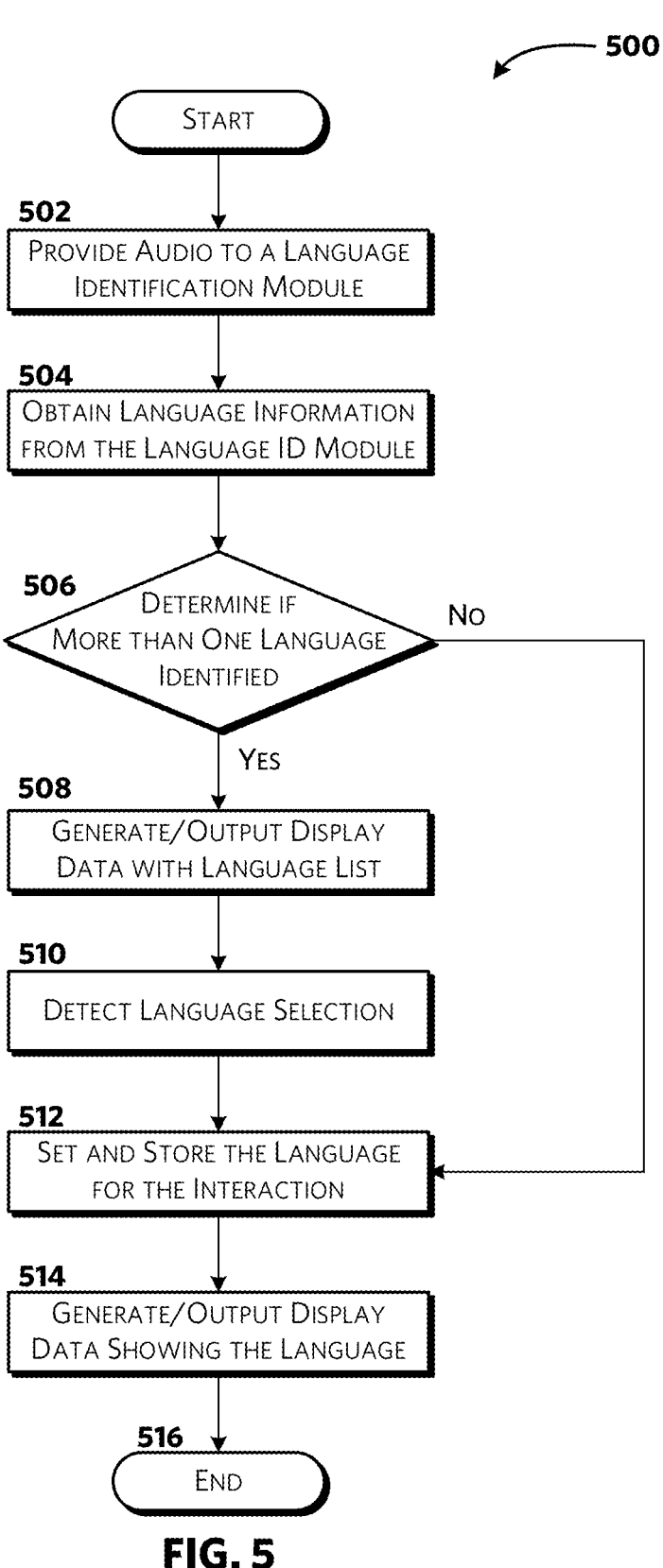
FIG. 5 is a flow diagram showing aspects of a method for setting a language for a customer during an interaction, according to an illustrative embodiment of the concepts and technologies described herein.

Turning now to FIG. 5, aspects of a method 500 for setting a language for a customer during an interaction will be described in detail, according to an illustrative embodiment. It can be appreciated that in some embodiments of the concepts and technologies disclosed herein, the functionality illustrated and described herein with reference to FIG. 5 can be performed in association with operation 318 of the method 300 illustrated and described above with reference to FIG. 3, though this is not necessarily the case in all embodiments. Because the method 500 can be performed at additional and/or alternative times, it should be understood that this example embodiment is illustrative, and therefore should not be construed as being limiting in any way.

For purposes of illustrating and describing the concepts of the present disclosure, the method 500 is described herein as being performed by the agent device 102 via execution of one or more software modules such as, for example, the interaction application 108 and/or the translation engine 110. It should be understood that additional and/or alternative devices and/or resources can provide the functionality described herein via execution of one or more modules, applications, and/or other software that can include, but are not limited to, the interaction application 108 and/or the translation engine 110 (and/or one or more components thereof). Thus, the illustrated embodiments are illustrative, and should not be viewed as being limiting in any way.

The method 500 begins at operation 502. At operation 502, the agent device 102 can provide audio (e.g., the audio data 124) to a language identification module 112. It can be appreciated that in some embodiments, the language identification module 112 can be a component of the translation engine 110, which can be executed at the agent device 102 and/or remotely executed (e.g., by the remote computer 120 or another device or resource). As such, operation 502 can include the agent device 102 transmitting data in some embodiments, though this is not necessarily the case in all embodiments. In any event, the audio data 124 can be provided as input to the language identification module 112 to trigger a language identification process as illustrated and described herein.

From operation 502, the method 500 can proceed to operation 504. At operation 504, the agent device 102 can obtain language information from the language identification module 112. It can be appreciated from the description herein that the language information obtained in operation 504 can include and/or can correspond to the ranked language listing illustrated and described herein, which can include an indication of one or more language. The language information obtained in operation 504 can include any indication of one or more languages that can be output by the language identification module 112 in various embodiments. As such, it should be understood that this illustrated embodiment is illustrative should not be construed as being limiting in any way.

From operation 504, the method 500 can proceed to operation 506. At operation 506, the agent device 102 can determine if more than one language is or has been identified. For example, the agent device 102 can determine in operation 506 if language information such as a language indication and/or a ranked language listing obtained in operation 504 lists more than one possible match for the speech detected in the audio, or if only one language is identified in the language information obtained in operation 504. According to various embodiments, the agent device 102 can analyze the language information to determine if one or more than one language is identified. It should be understood that this example embodiment is illustrative, and therefore should not be construed as being limiting in any way.

If the agent device 102 determines, in operation 506, that more than one language is or has been identified (e.g., that more than one language is a possible match for the speech detected in the audio), the method 500 can proceed to operation 508. At operation 508, the agent device 102 can generate and/or output display data 128 that, when rendered, can result in the presentation of the list of languages (e.g., the ranked language listing illustrated and described herein). It can be appreciated that the list of languages can be presented on the display 126 to enable the customer or another entity to select the correct language from the list. According to some embodiments, the languages can be presented in the respective language so the customer can select his or her language in his or her language. Thus, for example, a list of possible languages that can include Hebrew and Arabic may be displayed with Hebrew spelled in Hebrew (i.e., עִבְרִית) and Arabic spelled in Arabic (i.e., עֲבֿרִית), respectively). It should be understood that this example embodiment is illustrative, and therefore should not be construed as being limiting in any way.

According to various embodiments, the languages can be presented on the display 126 (e.g., can be represented in the display data 128) in order of probability (e.g., the most likely language can be listed first, the second most likely language can be listed second, etc.). The languages can be presented with one or more options to select or set the language, if desired. It should be understood that this example embodiment is illustrative, and therefore should not be construed as being limiting in any way.

From operation 508, the method 500 can proceed to operation 510. At operation 510, the agent device 102 can detect a language selection. For example, the agent device 102 can detect, in operation 510, a selection of a language from the list of languages such as the ranked language listing. This selection can be used to set the language for the customer. In some embodiments, for example, the selection of a language of multiple languages can result in the setting of the language in a manner that can be similar or even identical to a manner in which the language can be determined if the language identification module 112 identifies and/or returns only one language. It should be understood that this example embodiment is illustrative, and therefore should not be construed as being limiting in any way.

From operation 510, the method 500 can proceed to operation 512. The method 500 also can proceed to operation 512 if the agent device 102 determines, in operation 506, that only one language is identified (e.g., is a possible match) for the speech detected in the audio. At operation 512, the agent device 102 can set and store the language for the interaction. Thus, in operation 512 the agent device 102 can set the language (for the customer) and store information reflecting that language for the duration of the interaction. It should be understood that this example embodiment is illustrative, and therefore should not be construed as being limiting in any way.

From operation 512, the method 500 can proceed to operation 514. At operation 514, the agent device 102 can generate and/or output display data 128 that, when rendered by the agent device 102, causes the agent device 102 to present the language (determined and/or specified by the language identification module 112 and/or selected by the customer or other user). The language can be presented in some embodiments with an option to select a new language, or the like, though this is not necessarily the case in all embodiments.

From operation 514, the method 500 can proceed to operation 516. The method 500 can end at operation 516.

Figure 6:
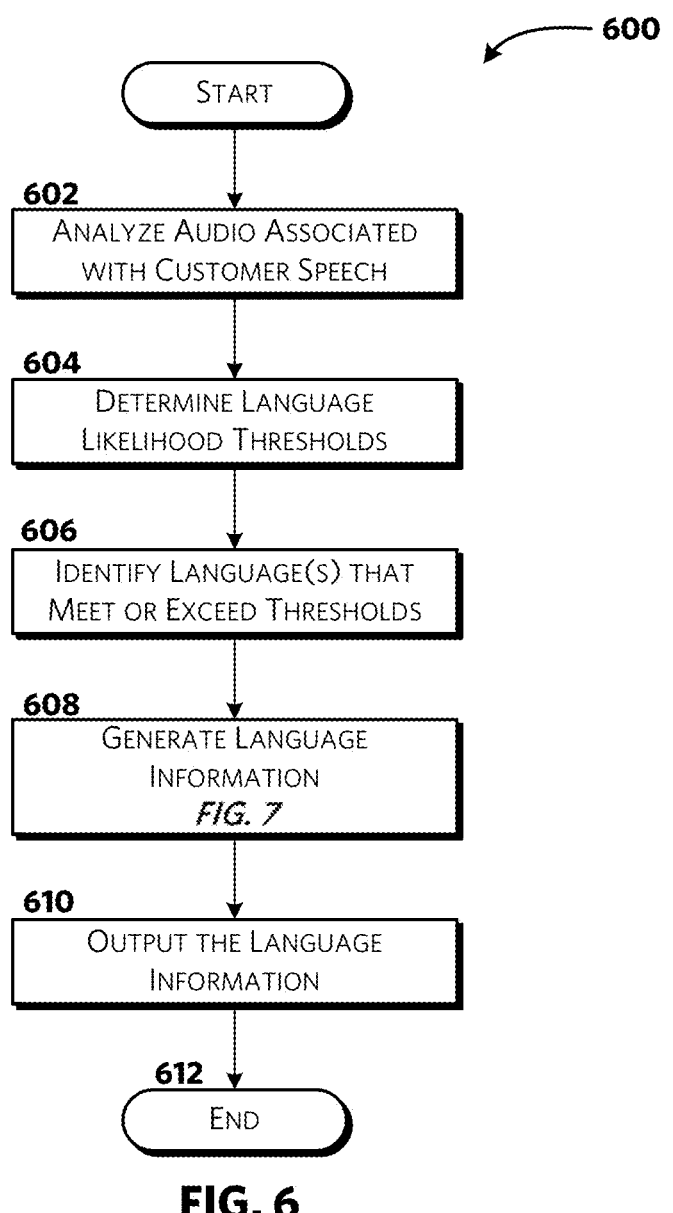
FIG. 6 is a flow diagram showing aspects of a method for determining a language of a customer using a language identification module, according to an illustrative embodiment of the concepts and technologies described herein.

Turning now to FIG. 6, aspects of a method 600 for determining a language of a customer using a language identification module 112 will be described in detail, according to an illustrative embodiment. It can be appreciated that in some embodiments of the concepts and technologies disclosed herein, the functionality illustrated and described herein with reference to FIG. 6 can be performed between operations 502 and 504 of the method 500 illustrated and described above with reference to FIG. 5, though this is not necessarily the case in all embodiments. Because the method 600 can be performed at additional and/or alternative times, it should be understood that this example embodiment is illustrative, and therefore should not be construed as being limiting in any way.

For purposes of illustrating and describing the concepts of the present disclosure, the method 600 is described herein as being performed by the agent device 102 via execution of one or more software modules such as, for example, the language identification module 112. It should be understood that additional and/or alternative devices and/or resources can provide the functionality described herein via execution of one or more modules, applications, and/or other software that can include, but are not limited to, the language identification module 112. Thus, the illustrated embodiments are illustrative, and should not be viewed as being limiting in any way.

The method 600 begins at operation 602. At operation 602, the agent device 102 can analyze audio (e.g., audio data 124) associated with a customer's speech. The analysis in operation 602 can include an analysis to identify spoken words and/or phrases, as well as recognition operations for determining languages associated and/or potentially associated with the speech represented by the audio. It can be appreciated that in some embodiments the agent device 102 can send the audio data 124 to another entity (e.g., the remote computer 120) to analyze the audio data 124, and the embodiment shown in FIG. 6 therefore should be understood as being illustrative of some embodiments and should not be construed as being limiting in any way.

Operation 602 also can include obtaining contextual information (e.g., from the context module 116). Thus, analyzing the language in operation 602 can include analyzing the language using the context determined by the context module 116, which can be used to disambiguate speech associated with the audio associated with the customer's speech. As noted above, the context can be used, for example, to identify languages most likely to be used based on a location, flight destination, flight origin, or the like. The context information also can be used during translation of the speech. Because context is not used in all embodiments of the concepts and technologies disclosed herein, it should be understood that this example embodiment of using context in association with operation 602 is illustrative, and therefore should not be construed as being limiting in any way.

From operation 602, the method 600 can proceed to operation 604. At operation 604, the agent device 102 can determine one or more language likelihood thresholds. According to various embodiments of the concepts and technologies disclosed herein, the language likelihood thresholds can be set by settings or configurations and can be stored in the libraries 118 and/or elsewhere at the agent device 102 and/or other devices or resources. In some instances, the language likelihood thresholds can specify a certainty, confidence, or probability with which a language must be identified to be selected as the language being spoken (and the language from which spoken speech is to be translated).

In some embodiments, the language likelihood thresholds may include 0.50 or 50%, i.e., a language identified by the language identification module 112 must have a probability of 0.50 or higher to be selected. In some other embodiments, the threshold can be set to a probability of 0.60 or 0.70 (or some other likelihood or certainty). This approach can be used to limit the determination of language to only languages that are considered sufficiently likely (or highly likely, etc.). It should be understood that this example embodiment is illustrative, and therefore should not be construed as being limiting in any way.

Operation 604 can correspond to the agent device 102 retrieving one or more language likelihood thresholds defined for the interaction application 108, the translation engine 110, the language identification module 112, and/or the translation module 114. In some embodiments, these thresholds can be set programmatically, while in some other embodiments the thresholds may be set and/or adjusted by a user or other entity. Thus, it can be appreciated that the thresholds may be stored in the libraries 118 and/or elsewhere in various embodiments.

From operation 604, the method 600 can proceed to operation 606. At operation 606, the agent device 102 can identify one or more languages that meet or exceed the language likelihood thresholds identified in operation 604. According to various embodiments of the concepts and technologies disclosed herein, the language identification module 112 can include an artificial intelligence module, machine learning model, and/or the like, and the language identification module 112 can analyze the language speech represented by the audio obtained in operation 602, transcribe the language, and analyze the transcription to determine the language being spoken. As noted above, context can be used in some embodiments of the concepts and technologies disclosed herein to determine languages being spoken, though this is not necessarily the case. At any rate, operation 606 can include in some embodiments obtaining contextual information from a context module 116 or other device(s) instead of, or in addition to, obtaining contextual information in association with operation 602. It should be understood that this example embodiment is illustrative, and therefore should not be construed as being limiting in any way.

In some embodiments, a possible language list may include any number of languages and the audio can be provided as input to a translation module 114 for each language that is possible, and languages that provide translations that seem probable (e.g., the translation is coherent, grammatically correct, or the like) may be identified as possible languages. As noted above, if one language satisfies the language likelihood threshold, that language can be identified as the language being spoken. Alternatively, if no single language that satisfies the language likelihood threshold is identified, multiple languages that collectively satisfy the language likelihood threshold (or other requirements) can be output as possible languages. Because the languages can be identified in additional and/or alternative manners, it should be understood that these example embodiments are illustrative, and therefore should not be construed as being limiting in any way.

From operation 606, the method 600 can proceed to operation 608. At operation 608, the agent device 102 can generate language information. As explained above, the agent device 102 can generate the language information to represent one or more languages that are possible matches for the customer speech being analyzed in operation 602. As such, operation 608 can include the agent device 102 generating an indication of one language or the agent device 102 generating a ranked language listing as illustrated and described herein. Additional details of generating the language information will be illustrated and described in more detail below with reference to FIG. 7.

From operation 608, the method 600 can proceed to operation 610. At operation 610, the agent device 102 can output the language information generated in operation 608. As explained herein, operation 610 can include the agent device 102 outputting the language or ranked language listing, e.g., generating display data 128 that, when rendered by the agent device 102, presents the one or more languages. It should be understood that this example embodiment is illustrative, and therefore should not be construed as being limiting in any way.

From operation 610, the method 600 can proceed to operation 612. The method 600 can end at operation 612.

Figure 7:
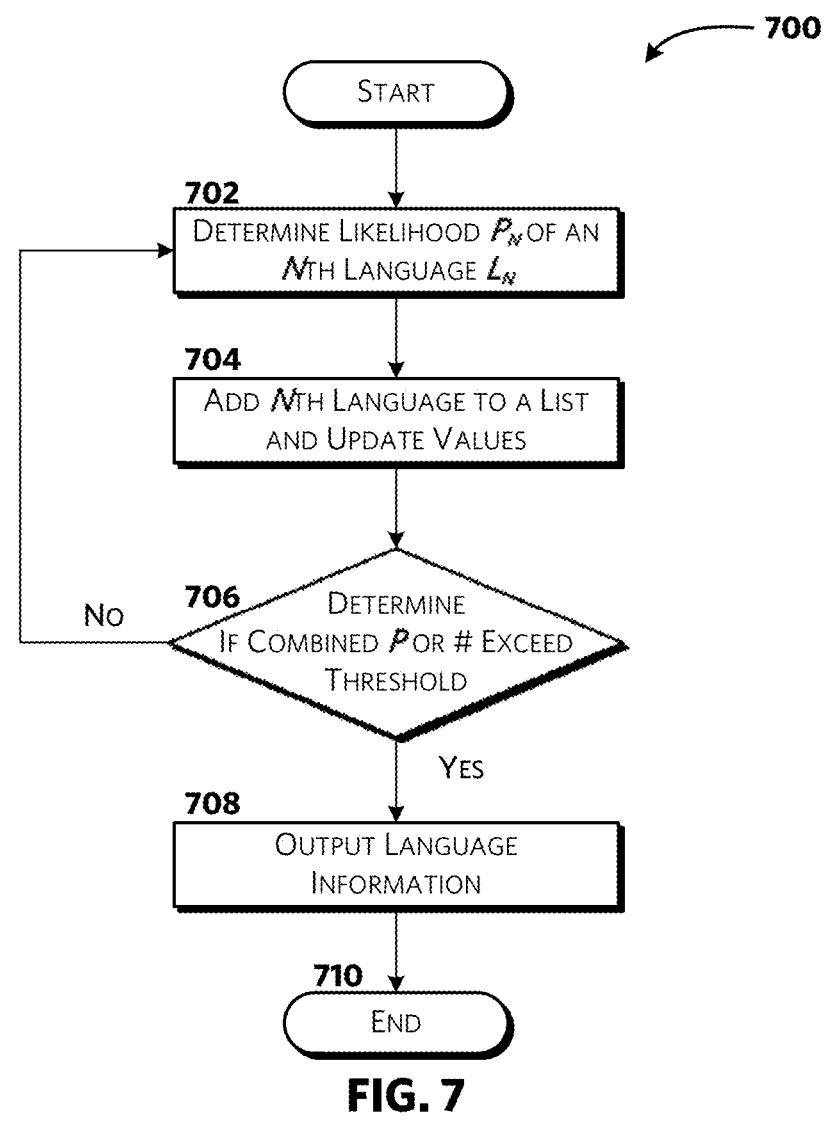
FIG. 7 is a flow diagram showing aspects of a method for generating a ranked language listing using a language identification module, according to an illustrative embodiment of the concepts and technologies described herein.

Turning now to FIG. 7, aspects of a method 700 for generating language information using a language identification module 112 will be described in detail, according to an illustrative embodiment. It can be appreciated that in some embodiments of the concepts and technologies disclosed herein, the functionality illustrated and described herein with reference to FIG. 7 can be performed in association with operation 608 of the method 600 illustrated and described above with reference to FIG. 6, though this is not necessarily the case in all embodiments. Because the method 700 can be performed at additional and/or alternative times, it should be understood that this example embodiment is illustrative, and therefore should not be construed as being limiting in any way.

For purposes of illustrating and describing the concepts of the present disclosure, the method 700 is described herein as being performed by the agent device 102 via execution of one or more software modules such as, for example, the language identification module 112. It should be understood that additional and/or alternative devices and/or resources can provide the functionality described herein via execution of one or more modules, applications, and/or other software that can include, but are not limited to, the language identification module 112. Thus, the illustrated embodiments are illustrative, and should not be viewed as being limiting in any way.

The method 700 begins at operation 702. It should be understood that in various embodiments, the agent device 102 can determine a language likelihood threshold (or probability or confidence, etc.) that may be required to set a language at the commencement of the method 700 and/or the agent device 102 may retrieve such a value from the settings, configurations, and/or from a storage device or resource. Similarly, in various embodiments, the agent device 102 may determine a maximum number of languages that may be identified as being likely, with this number also being retrieved from the settings, configurations, and/or from a storage device or resource. It should be understood that this example embodiment is illustrative, and therefore should not be construed as being limiting in any way.

At operation 702, the agent device 102 can determine an nth probability ($P_n$) of an nth language ($L_n$) being a match for the speech being analyzed. Thus, it can be appreciated that in operation 702 the agent device 102 can determine a likelihood of a particular nth language matching the speech being considered in the method 700. It should be understood that this example embodiment is illustrative, and therefore should not be construed as being limiting in any way.

From operation 702, the method 700 can proceed to operation 704. At operation 704, the agent device 102 can add the nth language $L_n$, to a list of possible languages (for the speech being analyzed in the method 700), and the agent device 102 also can update values for a combined likelihood (e.g., probability) P and a language count. Thus, in operation 704, the agent device 102 can add the likelihood determined in operation 702 to a combined likelihood and can add one to a running count of languages that have been identified as being likely matches for the speech being analyzed in the method 700.

As noted above, a combined likelihood (e.g., ninety percent) can be defined, as can a maximum number of languages (e.g., five). Thus, operation 704 can include the agent device 102 updating these values to determine if additional analysis of the speech is to be undertaken to identify additional languages. It should be understood that this example embodiment is illustrative, and therefore should not be construed as being limiting in any way.

From operation 704, the method 700 can proceed to operation 706. At operation 706, the agent device 102 can determine if the combined likelihood P exceeds the language likelihood thresholds and/or if the language count exceeds a maximum number of languages. It can be appreciated that if the agent device 102 determines that the combined likelihood exceeds a defined threshold, the agent device 102 can determine (or assume) that a satisfactory likelihood exists that one of the languages identified by the language identification module 112 is the correct language. Similarly, it can be appreciated that if the agent device 102 determines that the language count exceeds the maximum number of languages, that a satisfactory likelihood exists that one of the languages identified by the language identification module 112 is the correct language. It should be understood that this example embodiment is illustrative, and therefore should not be construed as being limiting in any way.

If the agent device 102 determines, in operation 706, that the combined probability P does not exceed the language likelihood thresholds and/or that the language count does not exceed the maximum number of languages, the method 700 can return to operation 702, and the agent device 102 can identify another language. As such, it can be appreciated that the agent device 102 can repeat performance of operations 702-706 until the agent device 102 determines, in any iteration of operation 706, that the combined probability P exceeds the language likelihood thresholds and/or that the language count exceeds the maximum number of languages. If the agent device 102 determines, in operation 706, that the combined probability P exceeds the language likelihood thresholds and/or that the language count exceeds the maximum number of languages, the method 700 can proceed to operation 708.

At operation 708, the agent device 102 can output language information such as a single language indicator, a ranked list of languages, or the like. According to various embodiments as illustrated and described herein, if the agent device 102 identifies more than one language as being possible for the speech analyzed by way of FIG. 7, the agent device 102 can be configured to order the languages identified in order from the most likely language to the least likely language among the identified languages. It should be understood that this example embodiment is illustrative, and therefore should not be construed as being limiting in any way.

From operation 708, the method 700 can proceed to operation 710. The method 700 can end at operation 710.

Figure 8A:
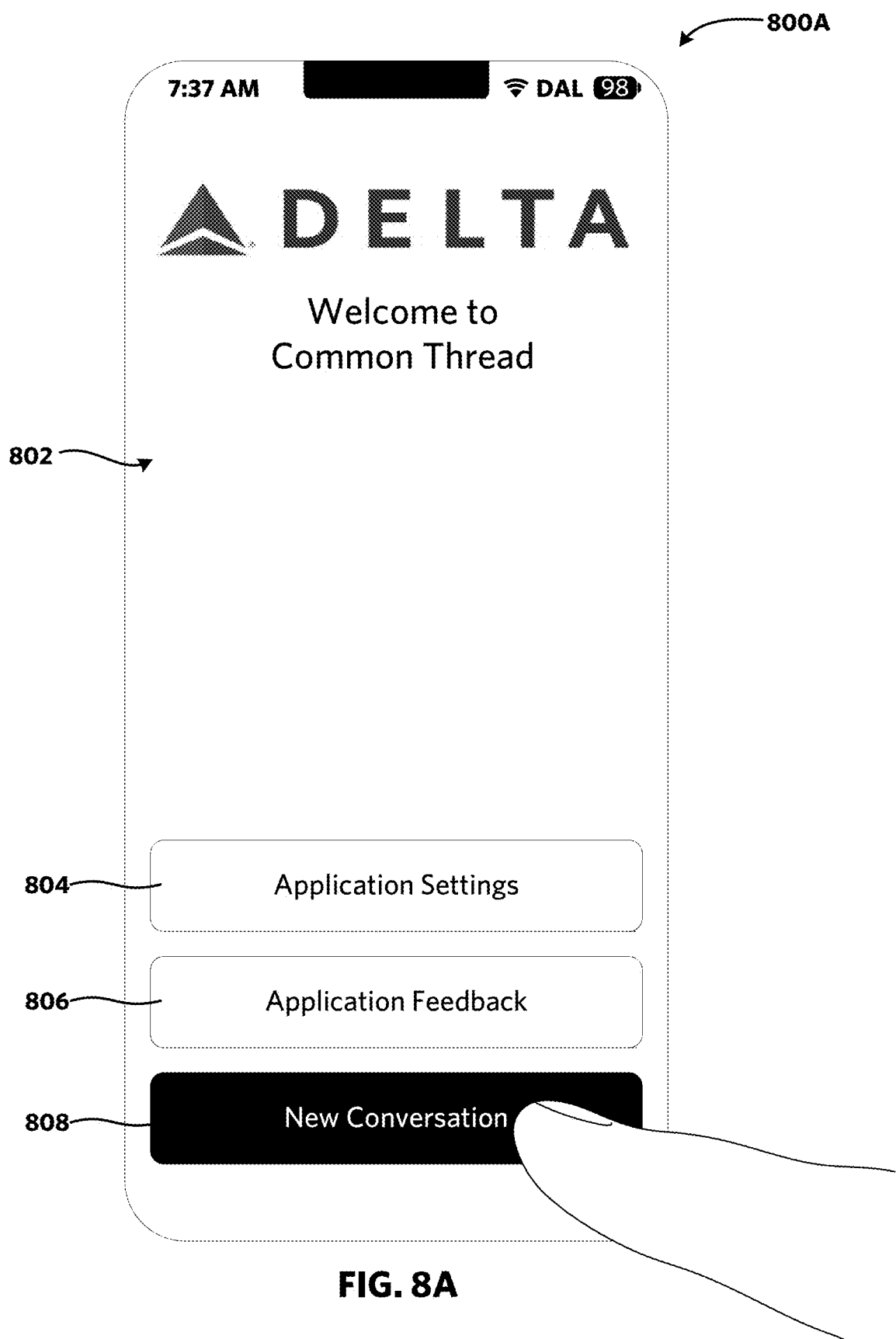
FIGS. 8A-8K are user interface diagrams showing various screen displays for automatic translation using an interaction application, according to some illustrative embodiments of the concepts and technologies described herein.

FIGS. 8A-8K are user interface ("UI") diagrams showing aspects of UIs for obtaining and/or using automatic translation using an interaction application 108, according to some illustrative embodiments. FIG. 8A shows an illustrative screen display 800A. According to some embodiments of the concepts and technologies described herein, the screen display 800A can be generated by a device such as the agent device 102 via interactions with the interaction application 108. In particular, in some embodiments the agent device 102 can generate the screen display 800A and/or other screen displays in conjunction with and/or based upon interactions with the interaction application 108 described herein, which can be configured to render the screen display 800A using display data 128 generated at the agent device 102 and/or at the remote computer 120.

It should be appreciated that the UI diagram illustrated in FIG. 8A is illustrative of one contemplated example of the UIs that can be generated and/or displayed in accordance with the concepts and technologies disclosed herein, and therefore should not be construed as being limiting in any way. According to various embodiments, the screen display 800A can be presented, for example, when the interaction application 108 is initiated at the agent device 102. Because the screen display 800A illustrated in FIG. 8A can be displayed at additional and/or alternative times, or not at all, it should be understood that these examples are illustrative and therefore should not be construed as being limiting in any way. For example, in some embodiments of the concepts and technologies disclosed herein, initiation of the interaction application 108 can cause the agent device 102 to initiate translation as illustrated and described herein, and therefore the screen display 800A may not be presented upon startup of the interaction application 108. It should be understood that this example embodiment is illustrative, and therefore should not be construed as being limiting in any way.

The screen display 800A can include various menus and/or menu options (not shown in FIG. 8A). The screen display 800A also can include an application startup screen

802. The application startup screen 802 can welcome a user or other entity and provide one or more options for a user or other entity such as, for example, an agent. For example, as shown in FIG. 8A, the application startup screen 802 can include an application settings option 804 that, when selected, can cause the agent device 102 to present an options screen for setting options and/or configurations. The application startup screen 802 also can include an application feedback option 806 that, when selected, can cause the agent device 102 to present a feedback screen for providing feedback on functionality associated with the interaction application. The application startup screen 802 also can include a new conversation option 808 that, when selected, can cause the agent device 102 to provide functionality illustrated and described herein for providing translation during a conversation. Because additional or alternative controls can be included in the application startup screen 802, it should be understood that the example embodiment shown in FIG. 8A is illustrative and therefore should not be construed as being limiting in any way.

Figure 8B:
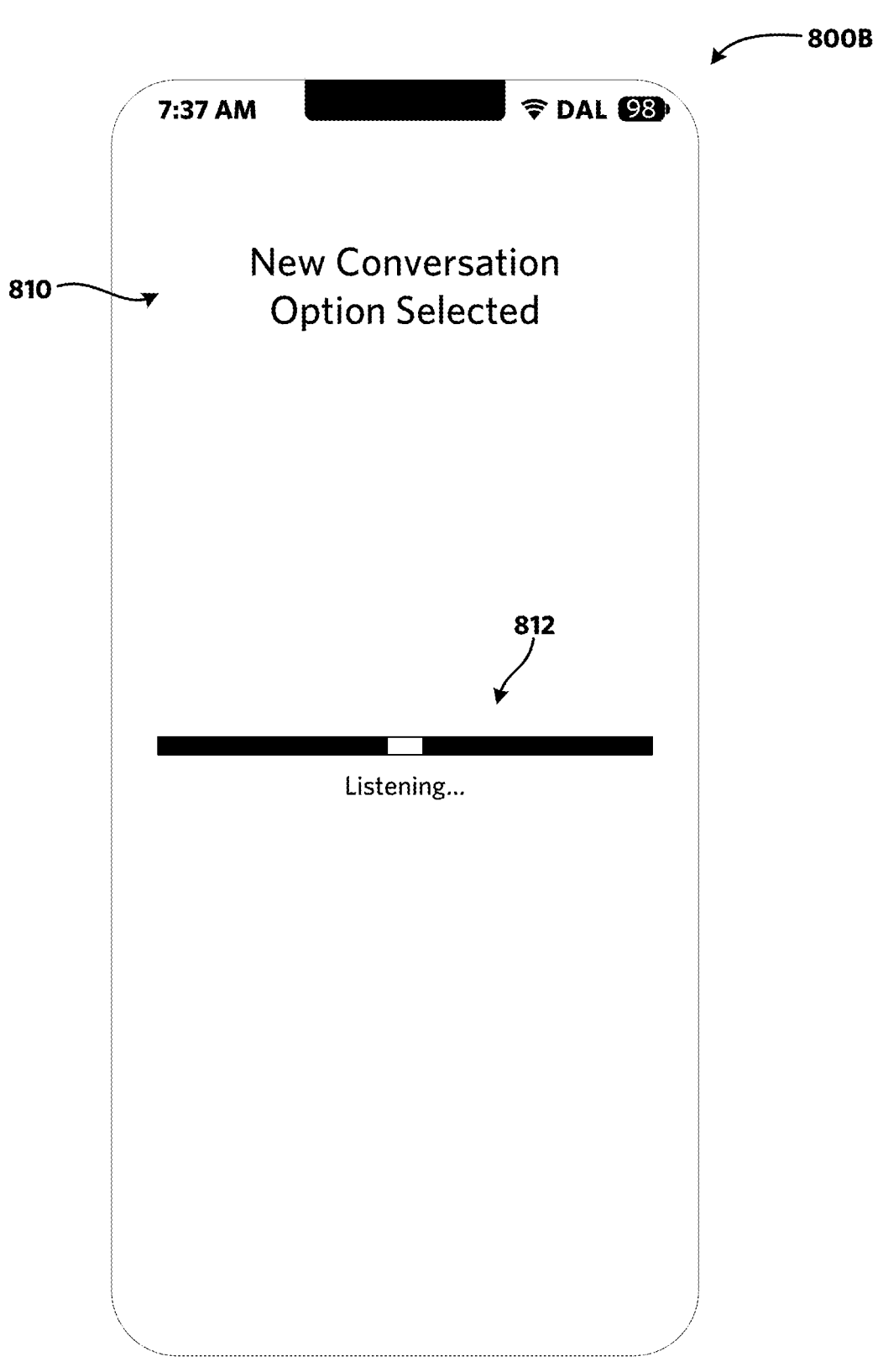

FIG. 8B shows an illustrative screen display 800B. According to some embodiments of the concepts and technologies described herein, the screen display 800B can be generated by a device such as the agent device 102 via interactions with the interaction application 108. In particular, in some embodiments the agent device 102 can generate the screen display 800B and/or other screen displays in conjunction with and/or based upon interactions with the interaction application 108 described herein, which can be configured to render the screen display 800B using display data 128 generated at the agent device 102 and/or at the remote computer 120.

It should be appreciated that the UI diagram illustrated in FIG. 8B is illustrative of one contemplated example of the UIs that can be generated and/or displayed in accordance with the concepts and technologies disclosed herein, and therefore should not be construed as being limiting in any way. According to various embodiments, the screen display 800B can be presented, for example, when an option to start a new conversation (e.g., via selection of the new conversation option 808 shown in FIG. 8A). In some other embodiments, the screen display 800B can be presented when the interaction application 108 is initiated without any selection of an option to start a new conversation. Because the screen display 800B illustrated in FIG. 8B can be displayed at additional and/or alternative times, it should be understood that these examples are illustrative and therefore should not be construed as being limiting in any way.

The screen display 800B also can include a new conversation screen 810. The new conversation screen 810 can indicate that the agent device 102 is being used for a new conversation. The new conversation screen 810 also can include a status bar 812, which can indicate that the agent device 102 is waiting for the agent or customer to speak. In some embodiments, the status bar 812 can be animated, and as the agent device 102 detects speech, the status bar 812 can change to provide feedback to the agent and/or the customer to the effect that speech is being detected and/or for other reasons. It should be understood that this example embodiment is illustrative, and therefore should not be construed as being limiting in any way.

Figure 8C:
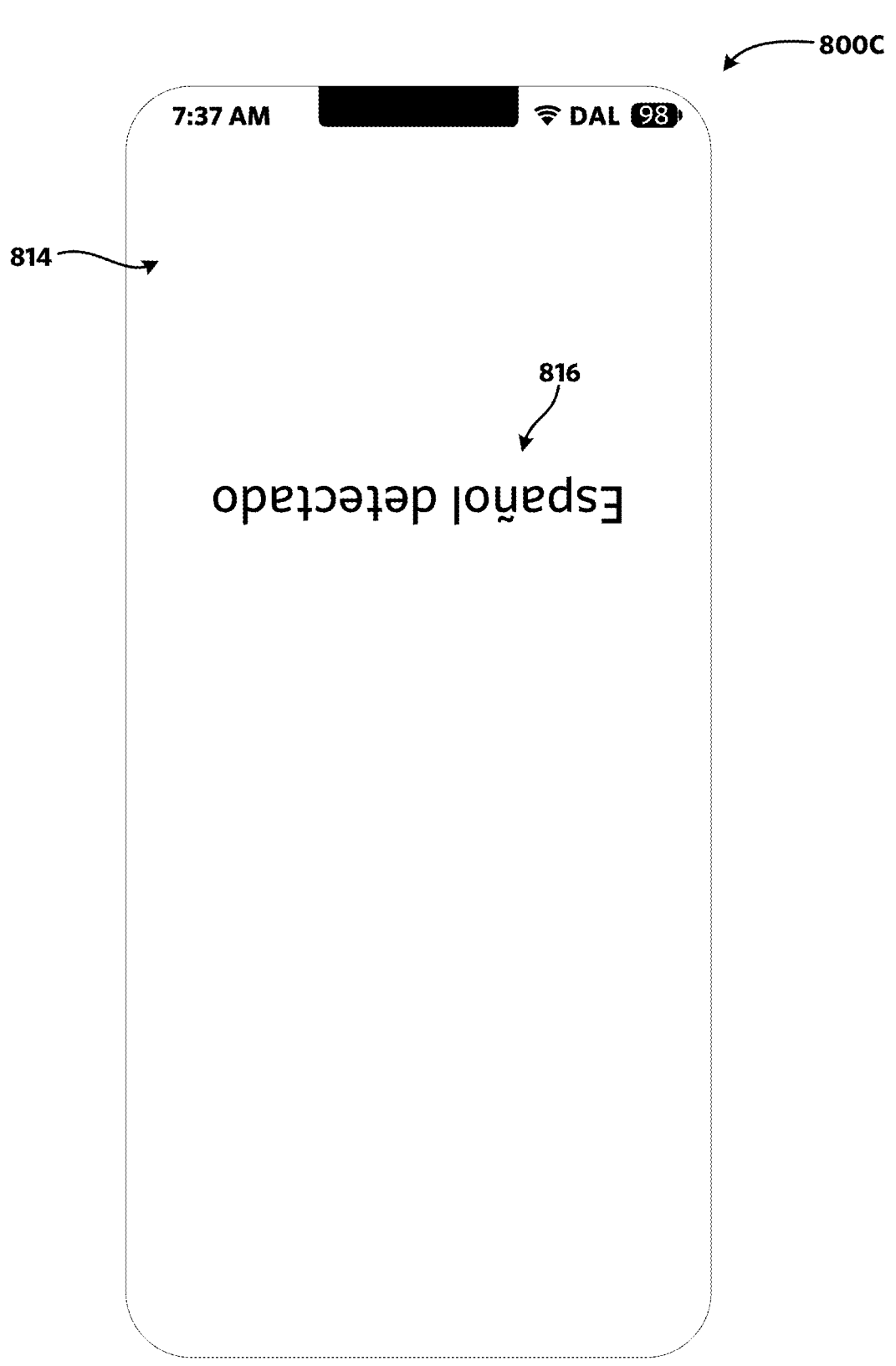

FIG. 8C shows an illustrative screen display 800C. According to some embodiments of the concepts and technologies described herein, the screen display 800C can be generated by a device such as the agent device 102 via interactions with the interaction application 108. In particular, in some embodiments the agent device 102 can generate the screen display 800C and/or other screen displays in conjunction with and/or based upon interactions with the interaction application 108 described herein, which can be configured to render the screen display 800C using display data 128 generated at the agent device 102 and/or at the remote computer 120.

It should be appreciated that the UI diagram illustrated in FIG. 8C is illustrative of one contemplated example of the UIs that can be generated and/or displayed in accordance with the concepts and technologies disclosed herein, and therefore should not be construed as being limiting in any way. According to various embodiments, the screen display 800C can be presented, for example, after a customer has spoken during a new conversation that has been started by the user or other entity and the interaction application 108 has identified only one language as being likely or possible for the spoken language of the customer. Because the screen display 800C illustrated in FIG. 8C can be displayed at additional and/or alternative times, it should be understood that this example embodiment is illustrative and therefore should not be construed as being limiting in any way.

The screen display 800C can include various menus and/or menu options (not shown in FIG. 8C). The screen display 800C also can include a language identification screen 814. The language identification screen 814 can include a language identifier 816, which can indicate the language that has been identified by the agent device 102 (or other device) for the speech detected by the agent device 102 (e.g., when the customer spoke). In the illustrated embodiment, the language identifier 816 indicates (in Spanish) that Spanish has been detected. It can be appreciated that this indication can be in response to the customer saying something in Spanish.

Furthermore, it can be appreciated with reference to FIG. 8C that the text associated with the language identifier 816 can be presented upside down (relative to other text on the screen display 800C). This orientation can allow the agent to hold the agent device 102 in the normal manner while enabling the customer to read the language identifier 816 without moving the orientation of the agent device 102. This is optional in some embodiments. It should be understood that this example embodiment is illustrative, and therefore should not be construed as being limiting in any way. Because additional or alternative controls can be included in the language identification screen 814, it should be understood that the example embodiment shown in FIG. 8C is illustrative and therefore should not be construed as being limiting in any way.

Figure 8D:
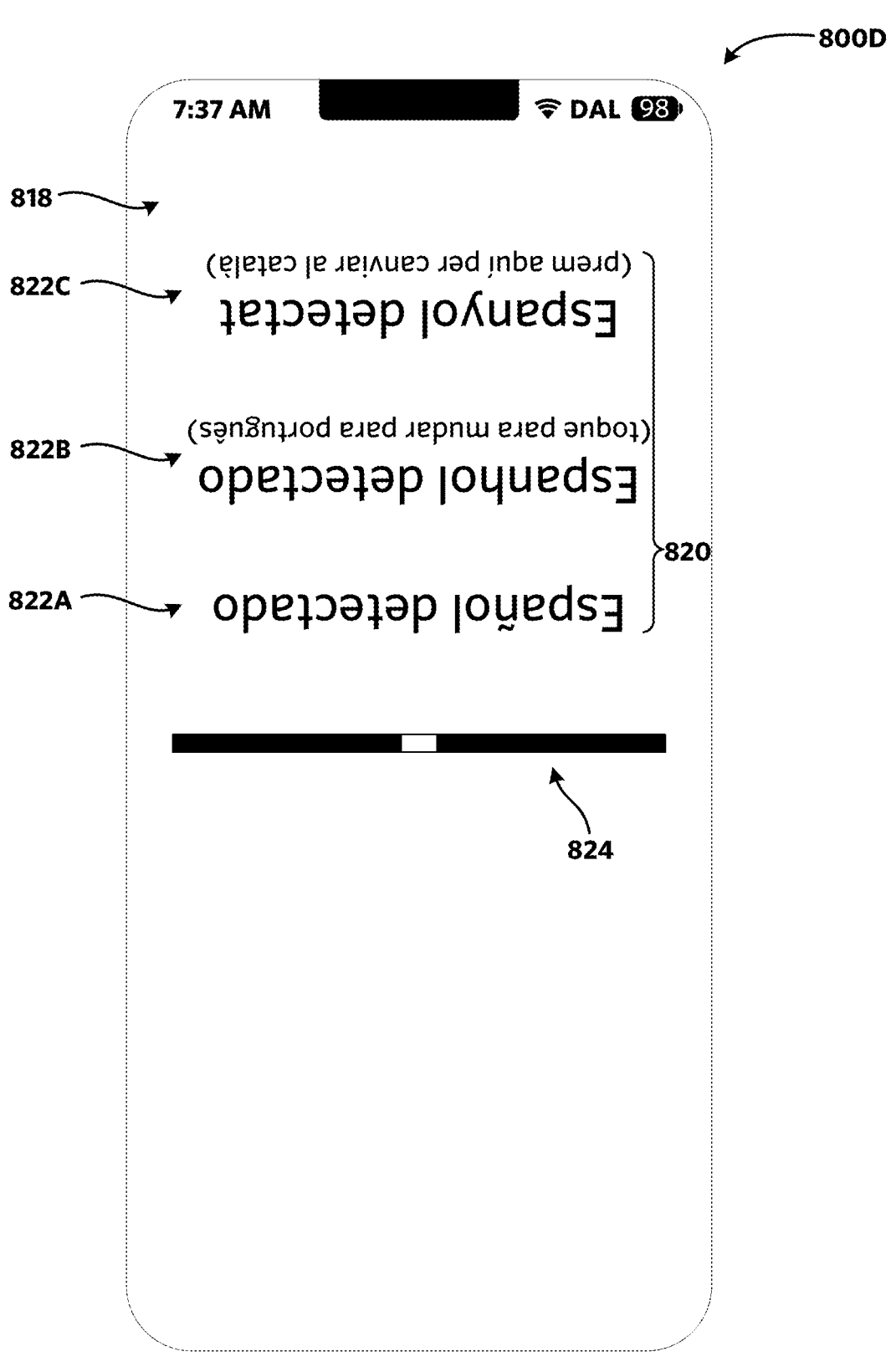

FIG. 8D shows an illustrative screen display 800D. According to some embodiments of the concepts and technologies described herein, the screen display 800D can be generated by a device such as the agent device 102 via interactions with the interaction application 108. In particular, in some embodiments the agent device 102 can generate the screen display 800D and/or other screen displays in conjunction with and/or based upon interactions with the interaction application 108 described herein, which can be configured to render the screen display 800D using display data 128 generated at the agent device 102 and/or at the remote computer 120.

It should be appreciated that the UI diagram illustrated in FIG. 8D is illustrative of one contemplated example of the UIs that can be generated and/or displayed in accordance with the concepts and technologies disclosed herein, and therefore should not be construed as being limiting in any way. According to various embodiments, the screen display 800D can be presented, for example, after a customer has spoken during a new conversation that has been started by the user or other entity, with the interaction application 108 and/or the language identification module 112 identifying more than one language as being likely and/or possible. Because the screen display 800D illustrated in FIG. 8D can be displayed at additional and/or alternative times, it should be understood that the illustrated example embodiment is illustrative and therefore should not be construed as being limiting in any way.

The screen display 800D can include various menus and/or menu options (not shown in FIG. 8D). The screen display 800D also can include a language listing and selection screen 818. The language listing and selection screen 818 can include a ranked language listing display 820, which can indicate two or more languages (three in the illustrated embodiment) that have been identified by the agent device 102 (or other device) as being likely and/or possible language matches for the speech detected by the agent device 102 (e.g., when the customer spoke). As explained herein, the languages listed in the ranked language listing can be ranked in order of probability and/or likelihood. Similarly, the languages depicted in the ranked language listing display 820 can be arranged in order of probability and/or likelihood. Because the text associated with the ranked language listing display 820 can be upside down relative to other text shown in the screen display 800D (e.g., for the reasons noted above with reference to FIG. 8C), the indicated languages can be arranged from top (most likely) to bottom (least likely) form the customer's perspective and from top (least likely) to bottom (most likely) from the agent's perspective. It should be understood that this example embodiment is illustrative, and therefore should not be construed as being limiting in any way.

In the illustrated embodiment, the ranked language listing display 820 can include a first indication 822A (in Spanish) that Spanish has been detected. It can be appreciated that this indication can be in response to the customer saying something that is determined by the interaction application 108 (and/or one or more modules of the translation engine 110) as most likely having been said in Spanish. In some embodiments, such as the embodiment shown in FIG. 8D, Spanish can be set by the interaction application 108 by virtue of being the most likely match for the language of the customer. In some other embodiments, however, the first indication 822A can be presented with text (e.g., in Spanish) requesting that the customer confirm the language choice by tapping on the words Español detectado, or the like. It should be understood that this example embodiment is illustrative, and therefore should not be construed as being limiting in any way.

The ranked language listing display 820 also can include a second indication 822B (in Portuguese) that Portuguese has been detected. It can be appreciated that this indication can be in response to the customer saying something that is determined by the interaction application 108 (and/or one or more modules of the translation engine 110) as having a second highest likelihood or probability of having been said in Portuguese. In some embodiments, such as the embodiment shown in FIG. 8D, the second indication 822B can be presented with text in Portuguese further indicating that the customer can change the language to Portuguese by tapping on the words Espanhol detectado, or the like. In response to the customer or other entity tapping on or otherwise selecting the second indication 822B, the interaction application 108 can set the language as Portuguese. It should be understood that this example embodiment is illustrative, and therefore should not be construed as being limiting in any way.

The ranked language listing display 820 also can include a third indication 822C (in Catalan) that Catalan has been detected. It can be appreciated that this indication can be in response to the customer saying something that is determined by the interaction application 108 (and/or one or more modules of the translation engine 110) as having a third highest likelihood or probability of having been said in Catalan. In some embodiments, such as the embodiment shown in FIG. 8D, the third indication 822C can be presented with text in Catalan further indicating that the customer can change the language to Catalan by tapping on the words Espanyol detectat, or the like. In response to the customer or other entity tapping on or otherwise selecting the third indication 822C, the interaction application 108 can set the language as Catalan. It should be understood that this example embodiment is illustrative, and therefore should not be construed as being limiting in any way.

It can be appreciated with reference to FIG. 8D that the languages listed in the ranked language listing display 820 can be arranged bottom to top from the agent's perspective (e.g., from the perspective of a user or other entity holding the agent device 102 in a standard orientation where the clock and signal information are arranged on top) while from the perspective of the customer who may be looking at the agent device 102 from another angle may see the languages listed in the ranked language listing display 820 arranged from top to bottom. It should be understood that this example embodiment is illustrative, and therefore should not be construed as being limiting in any way.

The screen display 800D also can include a conversation status bar 824, which can indicate that the agent device 102 is waiting for the agent or customer to speak or working on a translation of previously spoken words. In some embodiments, the conversation status bar 824 can be animated, and as the agent device 102 detects speech, the conversation status bar 824 can change to provide feedback to the agent and/or the customer to the effect that speech is being detected, translated, and/or the like. It should be understood that this example embodiment is illustrative, and therefore should not be construed as being limiting in any way. Because additional or alternative controls can be included in the language listing and selection screen 818, it should be understood that the example embodiment shown in FIG. 8D is illustrative and therefore should not be construed as being limiting in any way.

Figure 8E:
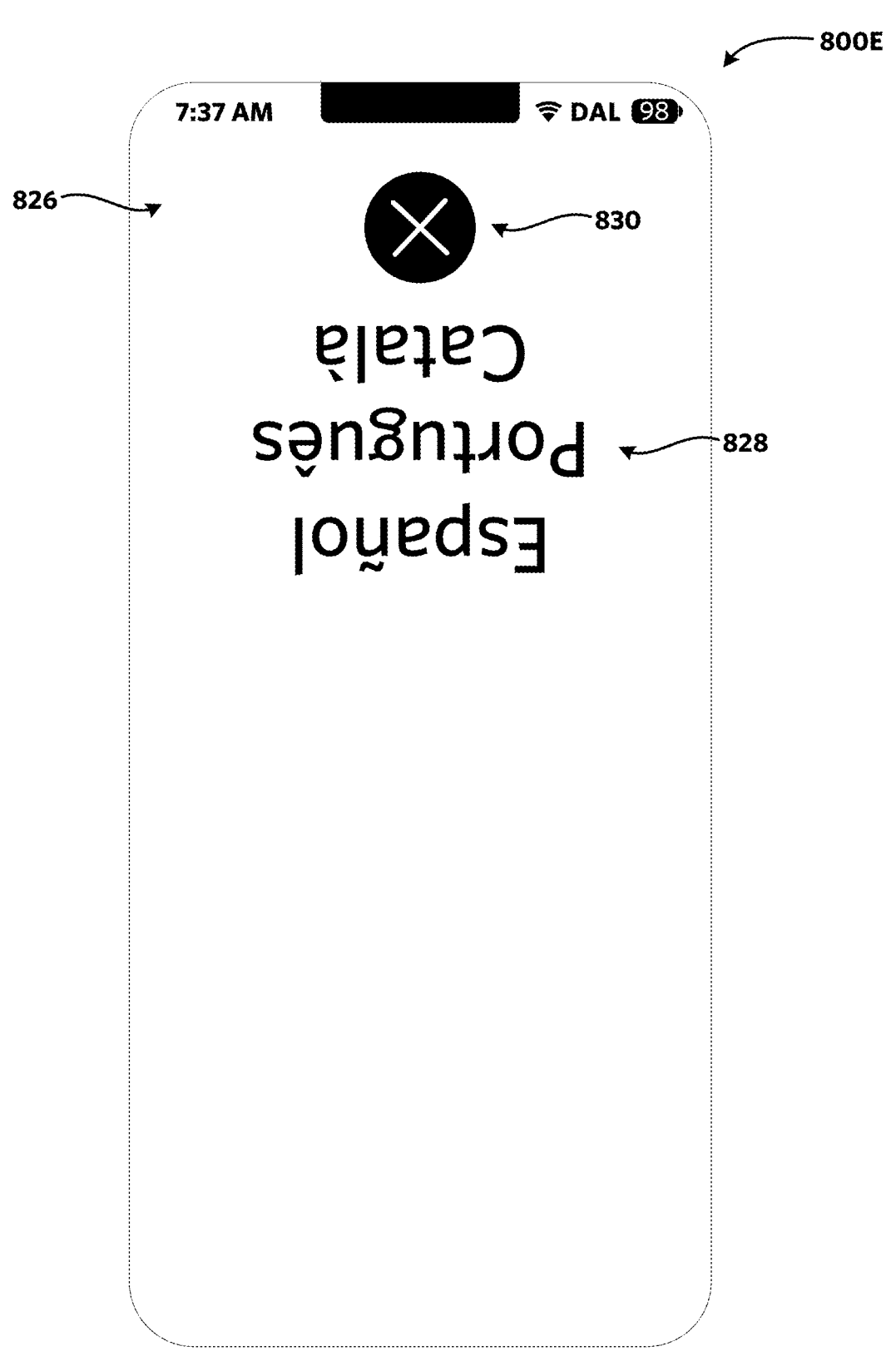

FIG. 8E shows an illustrative screen display 800E. According to some embodiments of the concepts and technologies described herein, the screen display 800E can be generated by a device such as the agent device 102 via interactions with the interaction application 108. In particular, in some embodiments the agent device 102 can generate the screen display 800E and/or other screen displays in conjunction with and/or based upon interactions with the interaction application 108 described herein, which can be configured to render the screen display 800E using display data 128 generated at the agent device 102 and/or at the remote computer 120.

It should be appreciated that the UI diagram illustrated in FIG. 8E is illustrative of one contemplated example of the UIs that can be generated and/or displayed in accordance with the concepts and technologies disclosed herein, and therefore should not be construed as being limiting in any way. According to various embodiments, the screen display 800E can be presented, for example, after a customer has spoken during a new conversation that has been started by the user or other entity, with the interaction application 108 and/or the language identification module 112 identifying more than one language as being likely and/or possible. As such, the embodiment shown in FIG. 8E can be considered an alternative embodiment of the screen display 800D shown in FIG. 8D. Because the screen display 800E illustrated in FIG. 8E can be displayed at additional and/or alternative times, it should be understood that the illustrated example embodiment is illustrative and therefore should not be construed as being limiting in any way.

The screen display 800E can include various menus and/or menu options (not shown in FIG. 8E). The screen display 800E also can include a language listing screen 826. The language listing screen 826 can include a language list 828 (which can be an alternative embodiment for the ranked language listing display 820 shown in FIG. 8D). The language list 828 can indicate two or more languages (three in the illustrated embodiment) that have been identified by the agent device 102 (or other device) as being likely and/or possible language matches for the speech detected by the agent device 102 (e.g., when the customer spoke). As explained herein, the languages listed in the language list 828 can be ranked in order of probability and/or likelihood. Because the text associated with the ranked language list 828 can be upside down relative to other text shown in the screen display 800E (e.g., for the reasons noted above with reference to FIG. 8C), the indicated languages can be arranged from top (most likely) to bottom (least likely) form the customer's perspective and from top (least likely) to bottom (most likely) from the agent's perspective. It should be understood that this example embodiment is illustrative, and therefore should not be construed as being limiting in any way.

In the illustrated embodiment, the language list 828 indicates, from most likely to least likely, Spanish (in Spanish), Portuguese (in Portuguese), and Catalan (in Catalan). It can be appreciated that these languages can be displayed in response to determining that the customer spoke in a language that is determined by the interaction application 108 (and/or one or more modules of the translation engine 110) as most likely being Spanish, second most likely Portuguese, and third most likely Catalan. It should be understood that this example embodiment is illustrative, and therefore should not be construed as being limiting in any way.

The screen display 800E also can include an exit conversation option 830, which can be selected by the agent or customer to end the conversation and/or to select a new language in some embodiments. Of course, the exit conversation option 830 may be displayed elsewhere on the screen display 800E. Because additional or alternative controls can be included in the language listing screen 826, it should be understood that the example embodiment shown in FIG. 8E is illustrative and therefore should not be construed as being limiting in any way.

Figure 8F:
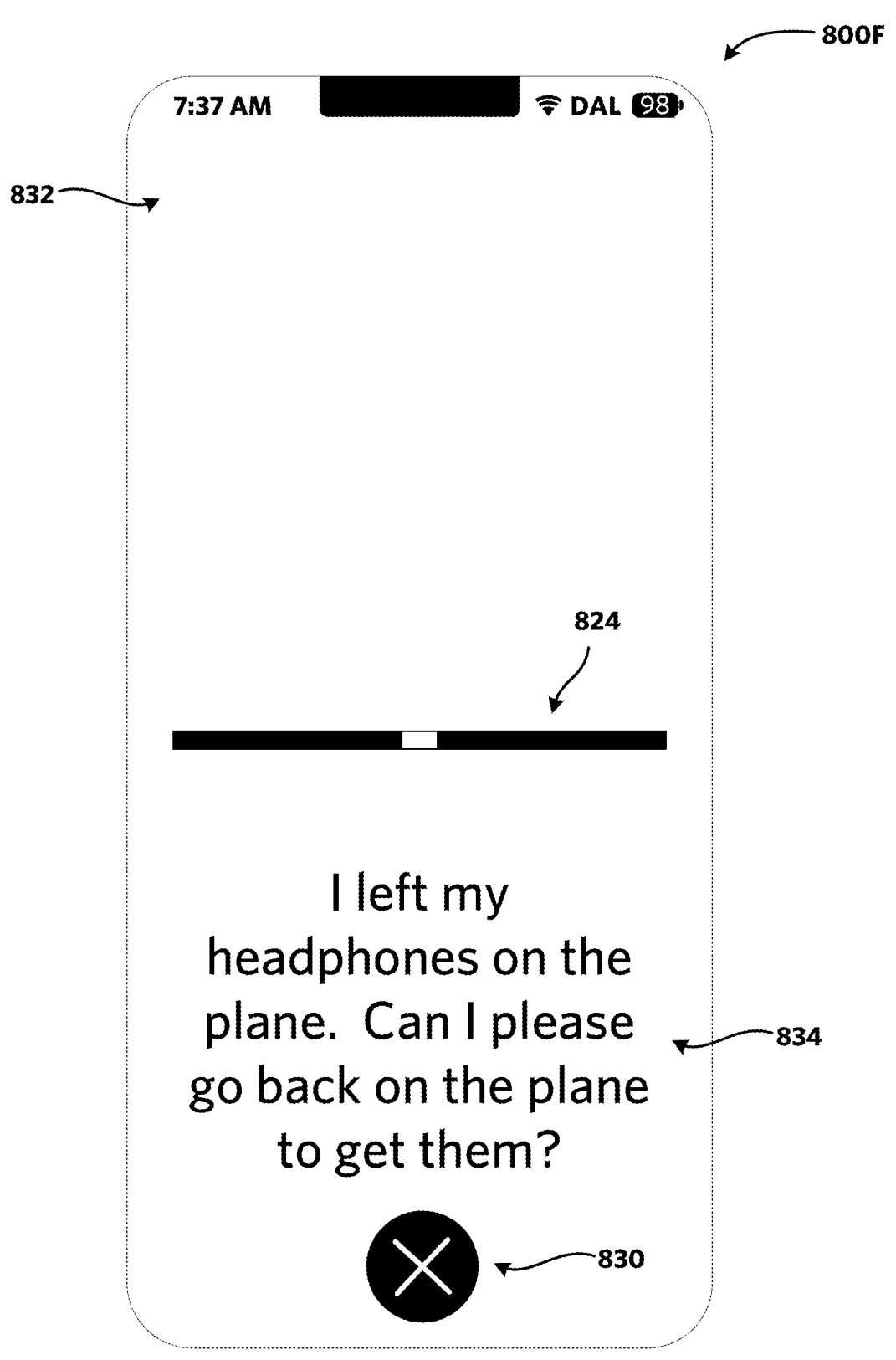

FIG. 8F shows an illustrative screen display 800F. According to some embodiments of the concepts and technologies described herein, the screen display 800F can be generated by a device such as the agent device 102 via interactions with the interaction application 108. In particular, in some embodiments the agent device 102 can generate the screen display 800F and/or other screen displays in conjunction with and/or based upon interactions with the interaction application 108 described herein, which can be configured to render the screen display 800F using display data 128 generated at the agent device 102 and/or at the remote computer 120.

It should be appreciated that the UI diagram illustrated in FIG. 8F is illustrative of one contemplated example of the UIs that can be generated and/or displayed in accordance with the concepts and technologies disclosed herein, and therefore should not be construed as being limiting in any way. According to various embodiments, the screen display 800F can be presented, for example, after a customer has spoken during a new conversation that has been started by the agent or other entity. Because the screen display 800F illustrated in FIG. 8F can be displayed at additional and/or alternative times, it should be understood that the illustrated example embodiment is illustrative and therefore should not be construed as being limiting in any way.

The screen display 800F can include various menus and/or menu options (not shown in FIG. 8F). The screen display 800F also can include a first conversation screen 832. The first conversation screen 832 can include a first translation 834. The first translation 834 can provide a translation of the customer's speech, which may have been spoken in any language recognized by the agent device 102 and/or another device (e.g., via execution of the interaction application 108 and/or the translation engine 110).

As shown in FIG. 8F, the first translation 834 indicates the customer's concern as expressed to the agent. It also can be appreciated with reference to FIG. 8F that the text associated with the first translation 834 may be arranged and/or oriented in standard orientation (i.e., not upside down relative to other text shown in the screen display 800F) because the agent is meant to read the first translation 834 and ostensibly is holding the agent device 102 in a normal manner (or laid the agent device 102 on a desk or the like). Thus, the agent device 102 does not need to be rotated or otherwise reoriented to enable both parties to read text during the conversation. It should be understood that this example embodiment is illustrative, and therefore should not be construed as being limiting in any way.

The screen display 800F also can include a status bar 824 as illustrated and described above, as well as an exit conversation option 830, which can be selected by the agent or customer to end the conversation and/or to select a new language in some embodiments. Because additional or alternative controls can be included in the first conversation screen 832, it should be understood that the example embodiment shown in FIG. 8F is illustrative and therefore should not be construed as being limiting in any way.

Figure 8G:
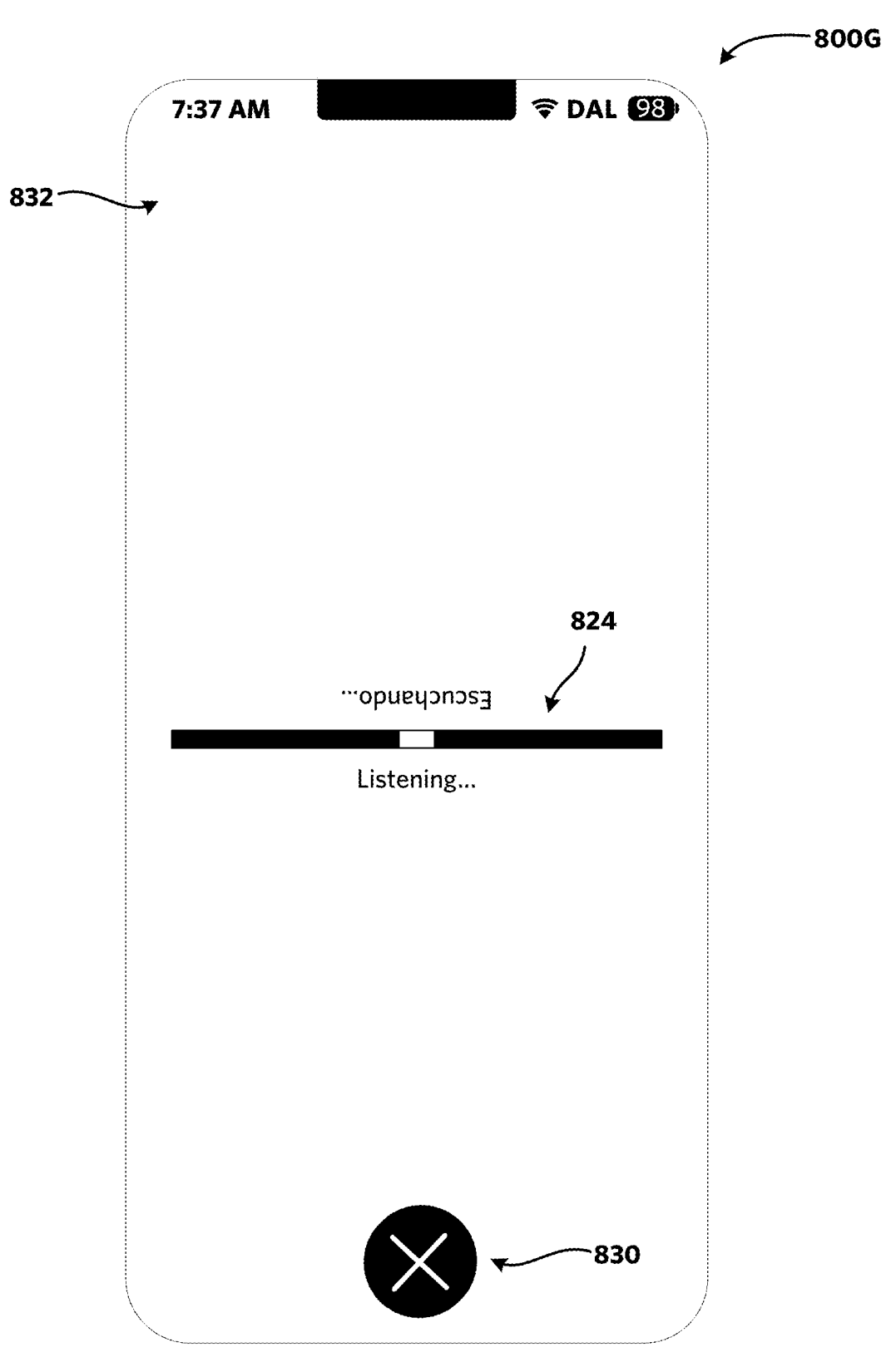

FIG. 8G shows an illustrative screen display 800G. According to some embodiments of the concepts and technologies described herein, the screen display 800G can be generated by a device such as the agent device 102 via interactions with the interaction application 108. In particular, in some embodiments the agent device 102 can generate the screen display 800G and/or other screen displays in conjunction with and/or based upon interactions with the interaction application 108 described herein, which can be configured to render the screen display 800G using display data 128 generated at the agent device 102 and/or at the remote computer 120.

It should be appreciated that the UI diagram illustrated in FIG. 8G is illustrative of one contemplated example of the UIs that can be generated and/or displayed in accordance with the concepts and technologies disclosed herein, and therefore should not be construed as being limiting in any way. According to various embodiments, the screen display 800G can be presented, for example, while an agent is speaking to a customer in response to reading a translation of the customer's speech such as that shown in FIG. 8F. Because the screen display 800G illustrated in FIG. 8G can be displayed at additional and/or alternative times, it should be understood that the illustrated example embodiment is illustrative and therefore should not be construed as being limiting in any way.

The screen display 800G can include a status bar 824 as illustrated and described above, as well as an exit conversation option 830, which can be selected by the agent or customer to end the conversation and/or to select a new language in some embodiments. As can be seen in FIG. 8G, the status bar 824 can communicate the current status and the status can be communicated by text in the agent's language (English in the illustrated embodiment) and the customer's language (Spanish in the illustrated embodiment), with the status being rotated appropriately for the respective party that will be reading the status. It should be understood that this example embodiment is illustrative, and therefore should not be construed as being limiting in any way. Because additional or alternative controls can be included in the first conversation screen 832, it should be understood that the example embodiment shown in FIG. 8G is illustrative and therefore should not be construed as being limiting in any way.

Figure 8H:
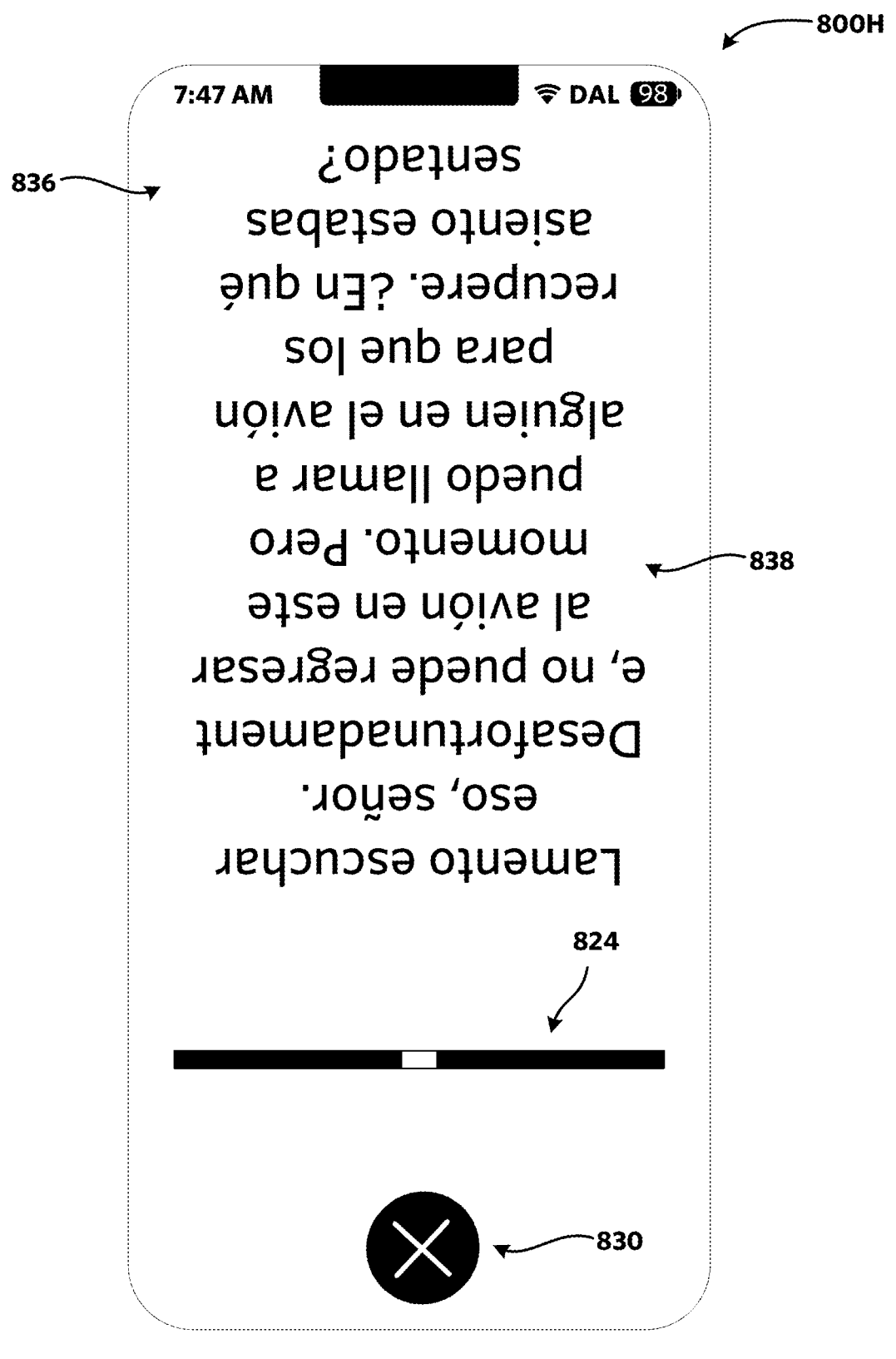

FIG. 8H shows an illustrative screen display 800H. According to some embodiments of the concepts and technologies described herein, the screen display 800H can be generated by a device such as the agent device 102 via interactions with the interaction application 108. In particular, in some embodiments the agent device 102 can generate the screen display 800H and/or other screen displays in conjunction with and/or based upon interactions with the interaction application 108 described herein, which can be configured to render the screen display 800H using display data 128 generated at the agent device 102 and/or at the remote computer 120.

It should be appreciated that the UI diagram illustrated in FIG. 8H is illustrative of one contemplated example of the UIs that can be generated and/or displayed in accordance with the concepts and technologies disclosed herein, and therefore should not be construed as being limiting in any way. According to various embodiments, the screen display 800H can be presented, for example, after an agent has spoken during the conversation and the agent device 102 has generated or obtained a translation of the agent's language. Because the screen display 800H illustrated in FIG. 8H can be displayed at additional and/or alternative times, it should be understood that the illustrated example embodiment is illustrative and therefore should not be construed as being limiting in any way.

The screen display 800H can include various menus and/or menu options (not shown in FIG. 8H). The screen display 800H also can include a second conversation screen 836. The second conversation screen 836 can include a second translation 838. The second translation 838 can provide a translation of the agent's speech, which may have been spoken in any language recognized by the agent device 102 and/or another device (e.g., via execution of the interaction application 108 and/or the translation engine 110). As shown in FIG. 8H, the second translation 838 indicates the agent's answer to the customer's question and/or concern. The agent's speech (e.g., in English) has been translated into the customer's language, as illustrated and described herein.

It also can be appreciated with reference to FIG. 8H that the text associated with the second translation 838 may be arranged and/or oriented upside down again (from the agent's viewpoint) because the customer may be meant to read the second translation 838 and ostensibly the agent is holding the agent device 102. Thus, the agent device 102 can rotate or otherwise reorient the text associated with the second translation 838 such that the agent device 102 does not need to be rotated or otherwise reoriented to enable both parties to read text during the conversation. It should be understood that this example embodiment is illustrative, and therefore should not be construed as being limiting in any way.

The screen display 800H also can include a status bar 824 as illustrated and described above, as well as an exit conversation option 830, which can be selected by the agent or customer to end the conversation and/or to select a new language in some embodiments. Because additional or alternative controls can be included in the second conversation screen 836, it should be understood that the example embodiment shown in FIG. 8H is illustrative and therefore should not be construed as being limiting in any way. It can be appreciated that the screen displays 800F, 800G, and 800H (and/or similar screen displays) can be iterated during the conversation to allow the agent to communicate with the customer with automatic translations being generated and presented for the agent and customer as illustrated and described herein. It should be understood that this example embodiment is illustrative, and therefore should not be construed as being limiting in any way.

Figure 8I:
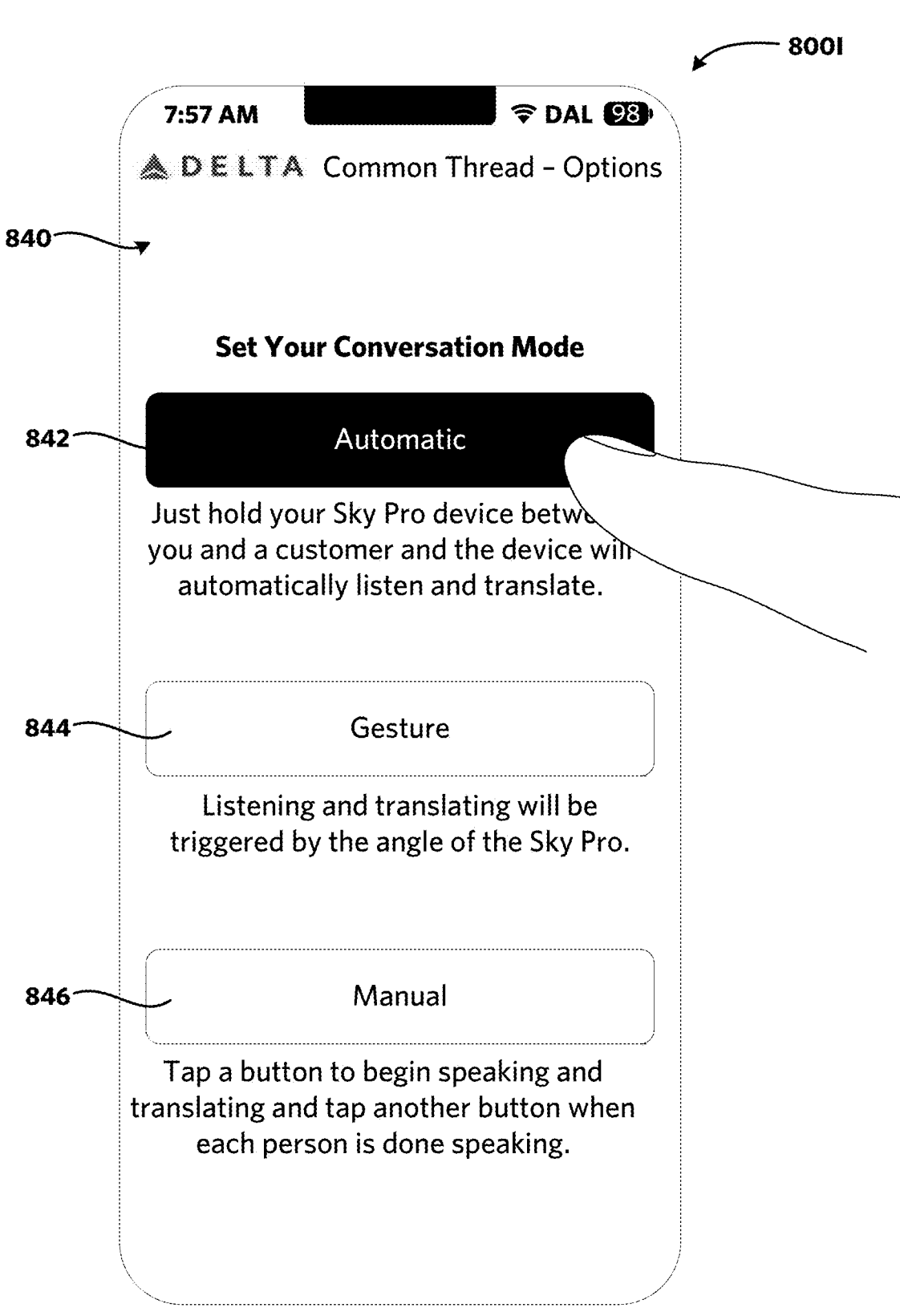

FIG. 8I shows an illustrative screen display 800I. According to some embodiments of the concepts and technologies described herein, the screen display 800I can be generated by a device such as the agent device 102 via interactions with the interaction application 108. In particular, in some embodiments the agent device 102 can generate the screen display 800I and/or other screen displays in conjunction with and/or based upon interactions with the interaction application 108 described herein, which can be configured to render the screen display 800I using display data 128 generated at the agent device 102.

It should be appreciated that the UI diagram illustrated in FIG. 8I is illustrative of one contemplated example of the UIs that can be generated and/or displayed in accordance with the concepts and technologies disclosed herein, and therefore should not be construed as being limiting in any way. According to various embodiments, the screen display 800I can be presented, for example, in response to an agent or other entity selecting the application options option 804 shown in FIG. 8A to access settings and/or configurations associated with the interaction application 108. Because the screen display 800I illustrated in FIG. 8I can be displayed at additional and/or alternative times, it should be understood that these examples are illustrative and therefore should not be construed as being limiting in any way.

The screen display 800I can include various menus and/or menu options (not shown in FIG. 8I). The screen display 800I also can include an application options screen 840. The application options screen 840 can enable an agent or other entity to set a conversation mode for the interaction application 108. For example, as shown in FIG. 8I, the application options screen 840 can include an automatic mode option 842 that, when selected, can cause the agent device 102 to support automatic translation between the customer and the agent.

In the automatic mode, which has been illustrated and described herein in detail, the agent device 102 can detect (without agent or customer input, instead being based only on speech of the customer) a language of the customer and store the language for use during the duration of the conversation. The automatic mode also can include orientation of the text such that movement and/or reorientation of the agent device 102 may be unnecessary during the conversation (e.g., the text can be arranged to allow both parties to read the text when facing one another with the agent device 102 between them without rotating and/or reorienting the agent device 102). It should be understood that this example embodiment is illustrative, and therefore should not be construed as being limiting in any way.

The application options screen 840 also can include a gesture mode option 844 that, when selected, can cause the agent device 102 to support automatic translation between the customer and the agent with the agent device 102 detecting (without agent or customer input, instead being based only on speech of the customer) a language of the customer and storing the language for use during the duration of the conversation. The gesture mode, however, can automatically reorient the text based on an angle and/or movement of the agent device 102. It should be understood that this example embodiment is illustrative, and therefore should not be construed as being limiting in any way.

The application options screen 840 also can include a manual mode option 846 that, when selected, can cause the agent device 102 to support automatic translation between the customer and the agent with the agent device 102 detecting (without agent or customer input, instead being based only on speech of the customer) a language of the customer and storing the language for use during the duration of the conversation. The manual mode, however, may only translate spoken words when a button is tapped or held. This mode may be helpful in noisy environments with many people speaking, such that the speech associated with the customer and the agent can more easily be detected in some embodiments. It should be understood that this example embodiment is illustrative, and therefore should not be construed as being limiting in any way. Because additional or alternative controls can be included in the application options screen 840, it should be understood that the example embodiment shown in FIG. 8I is illustrative and therefore should not be construed as being limiting in any way.

Figure 8J:
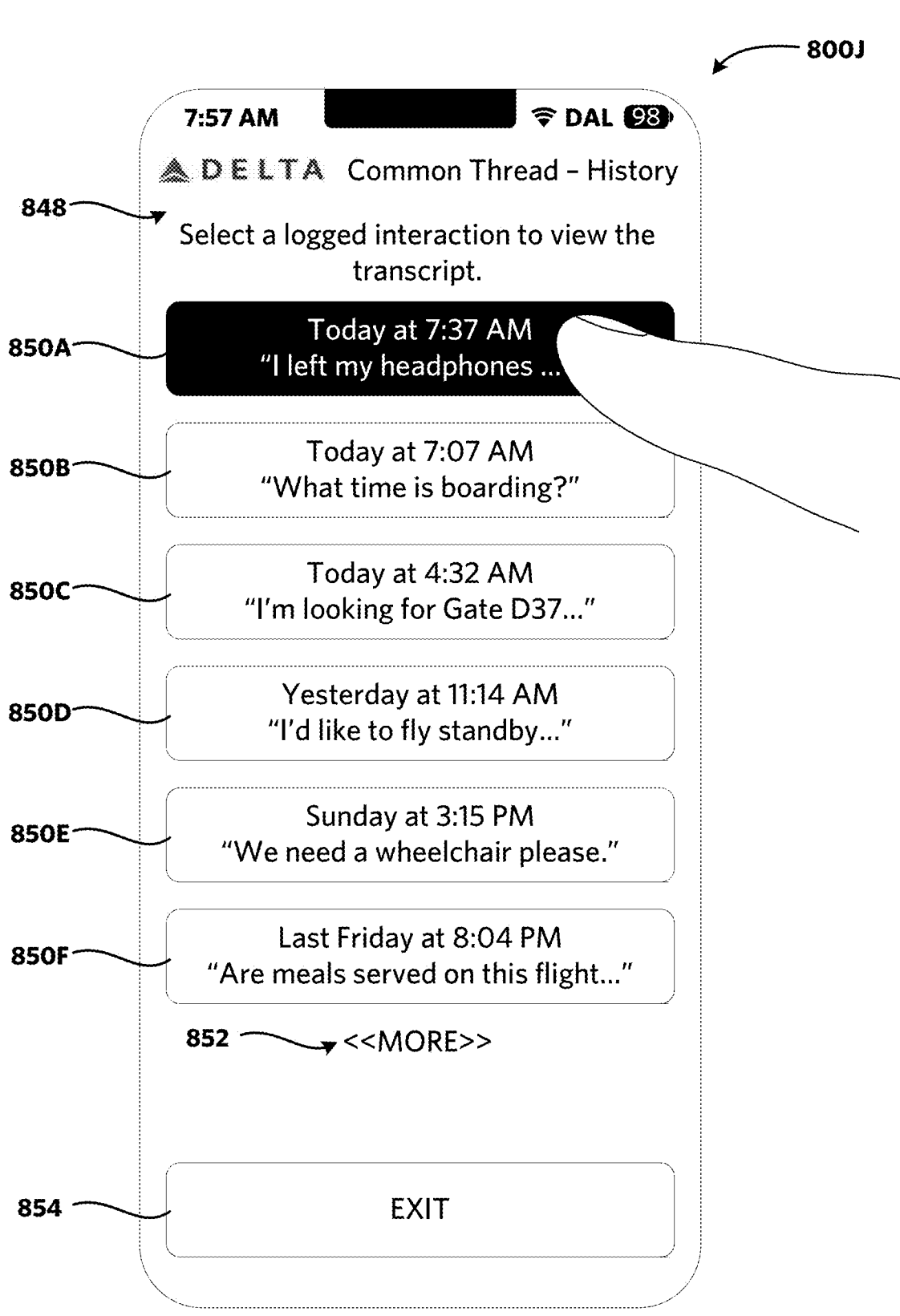

FIG. 8J shows an illustrative screen display 800J. According to some embodiments of the concepts and technologies described herein, the screen display 800J can be generated by a device such as the agent device 102 via interactions with the interaction application 108. In particular, in some embodiments the agent device 102 can generate the screen display 800J and/or other screen displays in conjunction with and/or based upon interactions with the interaction application 108 described herein, which can be configured to render the screen display 800J using display data 128 generated at the agent device 102. It should be appreciated that the UI diagram illustrated in FIG. 8J is illustrative of one contemplated example of the UIs that can be generated and/or displayed in accordance with the concepts and technologies disclosed herein, and therefore should not be construed as being limiting in any way. According to various embodiments, the screen display 800J can be presented, for example, in response to an agent or other entity selecting an option to view a history and/or transcripts with the interaction application 108. Because the screen display 800J illustrated in FIG. 8J can be displayed at additional and/or alternative times, it should be understood that these examples are illustrative and therefore should not be construed as being limiting in any way.

The screen display 800J can include various menus and/or menu options (not shown in FIG. 8J). The screen display 800J also can include a conversation history screen 848. The conversation history screen 848 can include conversation selector controls 850A-F (hereinafter collectively and/or generically referred to as "conversation selector controls 850") to enable an agent or other entity to select a conversation that was logged by the interaction application 108. In the illustrated embodiment, the respective conversation selector controls 850 can list the time and date of the conversation and the first few words (of the customer) associated with those conversations. Selection of one of the conversation selector controls 850 can cause the agent device 102 to retrieve and display a transcript associated with the conversation indicated on the conversation selector control 850. It should be understood that this example embodiment is illustrative, and therefore should not be construed as being limiting in any way.

The conversation history screen 848 also can include an option 852 to access more transcripts. In response to the option 852 being selected, the agent device 102 can present additional conversation selector controls 850 for accessing additional transcripts. It should be understood that this example embodiment is illustrative, and therefore should not be construed as being limiting in any way. The conversation history screen 848 also can include an exit control 854 for exiting the conversation history screen 848. Because additional or alternative controls can be included in the conversation history screen 848, it should be understood that the example embodiment shown in FIG. 8J is illustrative and therefore should not be construed as being limiting in any way.

Figure 8K:
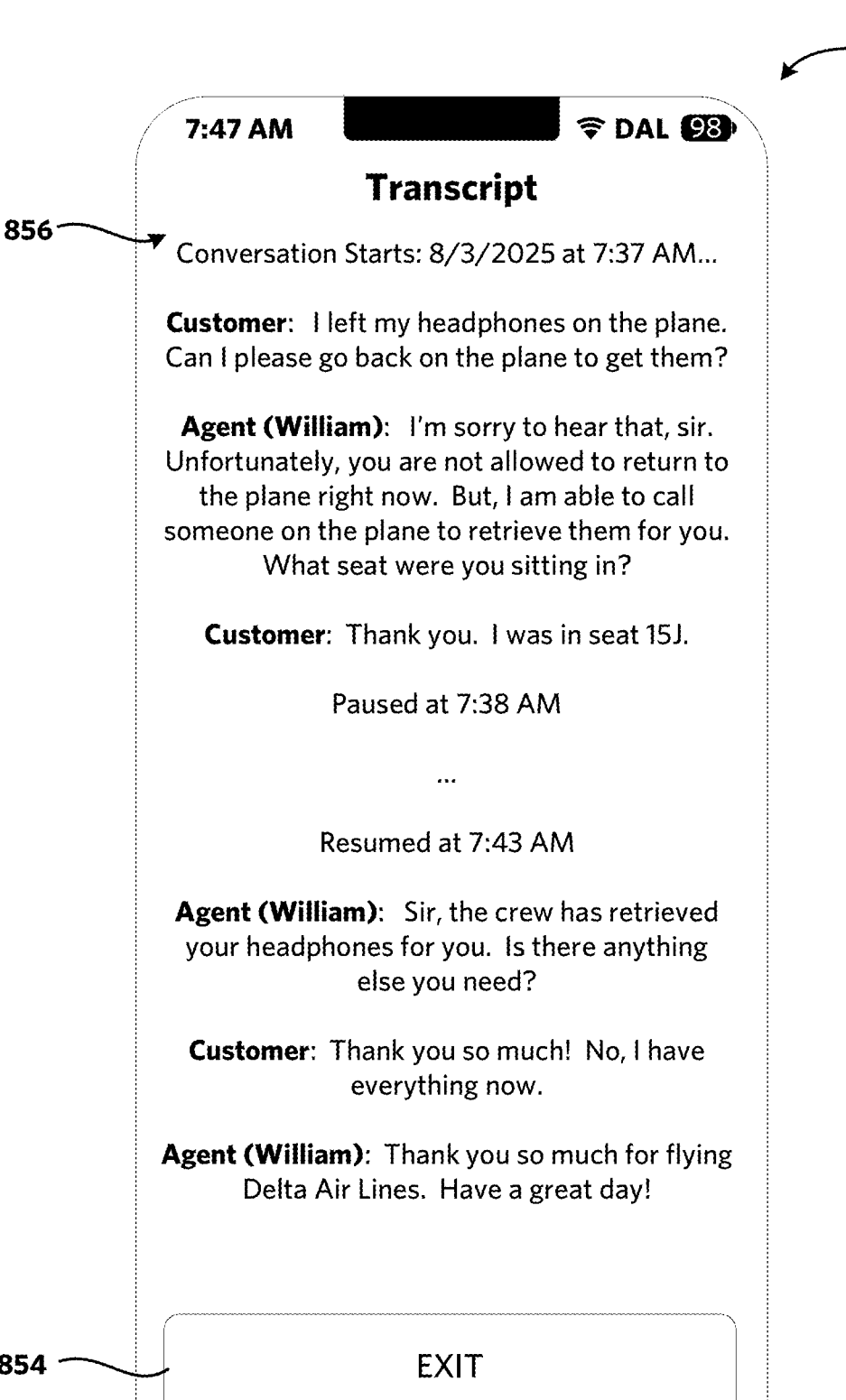

FIG. 8K shows an illustrative screen display 800K. According to some embodiments of the concepts and technologies described herein, the screen display 800K can be generated by a device such as the agent device 102 via interactions with the interaction application 108. In particular, in some embodiments the agent device 102 can generate the screen display 800K and/or other screen displays in conjunction with and/or based upon interactions with the interaction application 108 described herein, which can be configured to render the screen display 800K using display data 128 generated at the agent device 102.

It should be appreciated that the UI diagram illustrated in FIG. 8K is illustrative of one contemplated example of the UIs that can be generated and/or displayed in accordance with the concepts and technologies disclosed herein, and therefore should not be construed as being limiting in any way. According to various embodiments, the screen display 800K can be presented, for example, in response to an agent or other entity selecting the conversation selector control 850A shown in FIG. 8J. Because the screen display 800K illustrated in FIG. 8K can be displayed at additional and/or alternative times, it should be understood that these examples are illustrative and therefore should not be construed as being limiting in any way.

The screen display 800K can include various menus and/or menu options (not shown in FIG. 8K). The screen display 800K also can include a transcript screen 856. The transcript screen 856 can include a transcript of a conversation associated with the conversation selector control 850A. This transcript may be reviewed for any number of reasons such as, for example, customer service assurance or other reasons. The transcript screen 856 also can include an exit control 854 for exiting the transcript screen 856. Because additional or alternative controls can be included in the transcript screen 856, it should be understood that the example embodiment shown in FIG. 8K is illustrative and therefore should not be construed as being limiting in any way.

Figure 9:
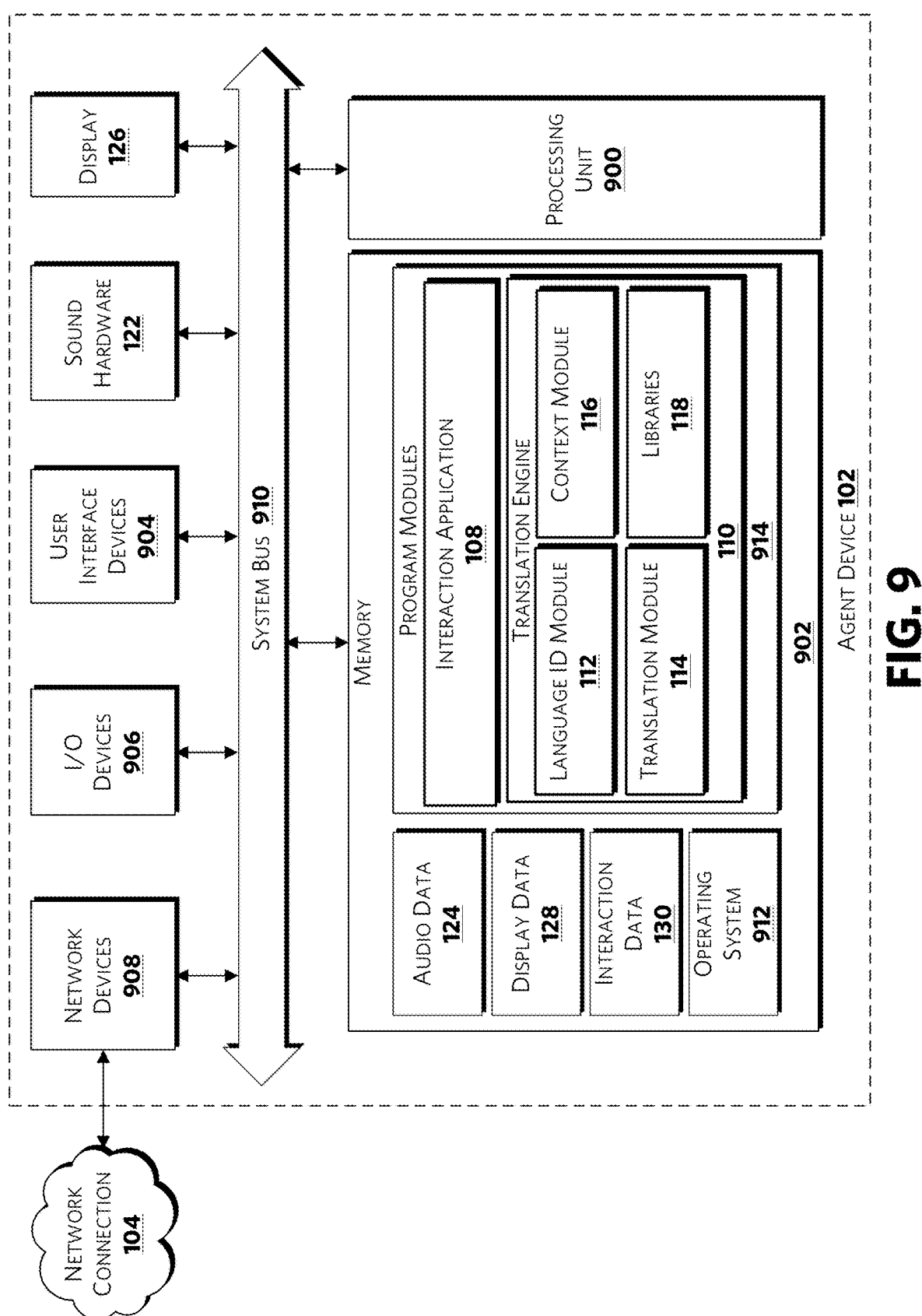
FIG. 9 is a block diagram illustrating an example agent device, according to some illustrative embodiments of the concepts and technologies described herein.

FIG. 9 is a block diagram illustrating an example architecture for the agent device 102 or the remote computer 120. It can be appreciated from the description herein that the agent device 102 can correspond in some embodiments to a handheld computing device such as a tablet, smartphone, or the like. In some embodiments, the agent device 102 can correspond to a desktop computer, a terminal computer, a laptop computer, or the like. It can be appreciated from the description herein that the remote computer 120 can include a web server, an application server, processing and data storage resources of a cloud-based computing architecture, or the like. Thus, it can be appreciated that some of the components shown in FIG. 9 (e.g., the system bus, input/output devices, etc.) may be omitted in some embodiments.

In the illustrated embodiment, the agent device 102 can include a processor or other processing unit ("processing unit") 900, a memory or other data storage device or resource ("memory") 902, one or more user interface devices 904, one or more input/output ("I/O") devices 906, and one or more network devices 908, each of which can be operatively connected to a system bus 910. The bus 910 can enable bi-directional communication between the processing unit 900, the memory 902, the user interface devices 904, the I/O devices 906, and the network devices 908.

The processing unit 900 can include a central processing unit ("CPU") that can perform arithmetic and logical operations, a more specific purpose programmable logic controller ("PLC"), a programmable gate array, or other type of processor known to those skilled in the art and suitable for controlling the operation of the server computer. As used herein and in the claims, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 902 can be accessed by and/or can communicate with the processing unit 900 (e.g., via the system bus 910). In some embodiments, the memory 902 can be operatively connected to a memory controller (not shown) that can enable communication with the processing unit 900 (e.g., via the system bus 910). The memory 902 can include an operating system 912 (e.g., the operating system 106 shown in FIG. 1) and one or more program modules 914. The operating system 912 can include, but is not limited to, members of the WINDOWS families of operating systems from MICROSOFT CORPORATION, members of the LINUX family of operating systems, members of the SYMBIAN family of operating systems from SYMBIAN LIMITED, members of the BREW family of operating systems from QUALCOMM CORPORATION, members of the MAC OS and/or iOS families of operating systems from APPLE CORPORATION, the FREEBSD family of operating systems, the SOLARIS family of operating systems from ORACLE CORPORATION, other operating systems, and the like.

The program modules 914 may include various software and/or program modules described herein. In some embodiments, for example, the program modules 914 can include the interaction application 108 and the translation engine 110, which as explained herein can include multiple components including the language identification module 112, the translation module 114, the context module 116, and the like. These and/or other programs can be embodied in computer-readable media containing instructions that, when executed by the processing unit 900, perform one or more of the methods 200, 300, 400, 500, 600, and/or 700 described in detail above with respect to FIGS. 2-7 and/or other functionality as illustrated and described herein. It can be appreciated that, at least by virtue of the instructions embodying the methods 200, 300, 400, 500, 600, 700, and/or other functionality illustrated and described herein being stored in the memory 902 and/or accessed and/or executed by the processing unit 900, the agent device 102 is a special-purpose computing system that can facilitate providing the functionality illustrated and described herein. According to embodiments, the program modules 914 may be embodied in hardware, software, firmware, or any combination thereof. The memory 902 also can be configured to store various data illustrated and described herein including, for example, the libraries 118, the audio data 124, the display data 128, the interaction data 130, and/or other data (e.g., voiceprints, languages, histories, thresholds, ranked language listings or other language information, translations, other data, and the like), if desired.

By way of example, and not limitation, computer-readable media may include any available computer storage media or communication media that can be accessed by the agent device 102. Communication media can include computer-readable instructions, data structures, program modules, or other data in a modulated data signal such as a carrier wave or other transport mechanism and can include any delivery media. The term "modulated data signal" means a signal that has one or more of its characteristics changed or set in a manner as to encode information in the signal. By way of example, and not limitation, communication media can include wired media such as a wired network or direct-wired connection, and wireless media such as acoustic, RF, infrared and other wireless media. Combinations of any of the above should also be included within the scope of computer-readable media.

Computer storage media can include volatile and nonvolatile, removable and non-removable media implemented in any method or technology for storage of information such as computer-readable instructions, data structures, program modules, or other data. Computer storage media can include, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the agent device 102. In the claims, the phrase "computer storage medium" and variations thereof does not include waves or signals per se and/or communication media as defined herein.

The user interface devices 904 may include one or more devices with which a user accesses the agent device 102. The user interface devices 904 may include, but are not limited to, computers, servers, personal digital assistants, cellular phones, or any suitable computing devices. The I/O devices 906 enable a user to interface with the program modules 914. In one embodiment, the I/O devices 906 are operatively connected to an I/O controller (not shown) that enables communication with the processing unit 900 via the system bus 910. The I/O devices 906 may include one or more input devices, such as, but not limited to, a keyboard, a mouse, or an electronic stylus. Further, the I/O devices 906 may include one or more output devices, such as, but not limited to, a display screen or a printer.

The network devices 908 enable the agent device 102 to communicate with other networks or remote systems via a network, such as the network connection 104. Examples of the network devices 908 include, but are not limited to, a modem, a radio frequency ("RF") or infrared ("IR") transceiver, a telephonic interface, a bridge, a router, or a network card. The network connection 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network connection 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although not separately illustrated in FIG. 9, it should be understood that the agent device 102 can include location determination devices such as a global positioning system ("GPS") receiver, which can be used to determine a location of the agent device 102. Other location determination devices and/or determination techniques are possible (e.g., connection to networking hardware having specific service set identifiers ("SSID"), network signal triangulation, IP address information, location beacons, and/or other identifiers that can be used to determine location), and therefore it should be understood that location can be determined in any number of manners including GPS. It should be understood that this example embodiment is illustrative, and therefore should not be construed as being limiting in any way.

Based on the foregoing, it should be appreciated that embodiments for providing automatic translation using an interaction application have been disclosed herein. Although the subject matter presented herein has been described with respect to various structural features and/or methodological and transformative acts for providing automatic translation using an interaction application and/or the various features thereof, it is to be understood that the concepts and technologies disclosed herein are not necessarily limited to the specific features or acts described herein. Rather, the specific features and acts are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A device comprising a processor and a memory that stores computer-executable instructions that, when executed by the processor, cause the processor to perform operations comprising:

detecting, at an agent device comprising sound hardware, a conversation between an agent and a customer, wherein data defining an agent language spoken by the agent and an agent voiceprint is stored at the agent device, and wherein the agent voiceprint comprises a unique pattern of voice characteristics of the agent;

capturing, using the sound hardware and during the conversation, audio data associated with the conversation, wherein the audio data comprises audio signals captured using the sound hardware, and wherein the audio signals represent first speech associated with the agent and second speech associated with the customer;

identifying, based on analysis of the audio signals, a first speaker associated with the first speech and a second speaker associated with the second speech, wherein the first speaker is determined to be the agent and to be speaking the agent language in response to speech characteristics of the first speech matching the agent voiceprint, and wherein the second speaker is determined to be the customer in response to the speech characteristics not matching the agent voiceprint;

determining, based on further analysis of the audio data, a customer language comprising a language spoken by the customer;

translating the second speech represented by the audio data to the agent language;

outputting, at a display of the agent device, first text representing a translation of the second speech in the agent language;

translating the first speech to the customer language; and outputting, at the display of the agent device, second text representing a translation of the first speech.

2. The device of claim 1, wherein identifying the first speaker further comprises determining that the first speech is spoken in the agent language.

3. The device of claim 1, wherein outputting the first text and the second text at the display of the agent device comprises:

generating a user interface comprising the first text oriented in a first orientation and the second text oriented in a second orientation that is upside down relative to the first orientation; and displaying the user interface at the agent device.

4. The device of claim 1, wherein the agent voiceprint is generated at the agent device, and wherein generating the agent voiceprint comprises:

obtaining, using the sound hardware, further audio data that represents a voice associated with the agent;

creating, based on the further audio data, the agent voiceprint; and storing the agent voiceprint with a data association that associates the agent voiceprint with the agent.

5. The device of claim 1, wherein determining the customer language comprises:

determining a language likelihood threshold defined for the agent device, the language likelihood threshold comprising a minimum probability that the second speech is spoken in a particular language;

identifying a plurality of languages that meet the language likelihood threshold; and outputting, on the display of the agent device, a display of a ranked language listing that identifies the plurality of languages in an order from largest probability to smallest probability, wherein a respective identifier of each of the plurality of languages is translated into a corresponding language, and wherein the customer language is selected from the ranked language listing to determine the customer language.

6. The device of claim 1, wherein determining the customer language comprises:

determining a first language spoken at a flight origin associated with a flight and a second language spoken at a flight destination associated with the flight, determining that the second language corresponds to the agent language, and determining that the first language comprises the customer language.

7. A method comprising:

detecting, at an agent device comprising a processor and sound hardware, a conversation between an agent and a customer, wherein data defining an agent language spoken by the agent and an agent voiceprint is stored at the agent device, and wherein the agent voiceprint comprises a unique pattern of voice characteristics of the agent;

capturing, by the processor and using the sound hardware and during the conversation, audio data associated with the conversation, wherein the audio data comprises audio signals captured using the sound hardware, and wherein the audio signals represent first speech associated with the agent and second speech associated with the customer;

identifying, by the processor and based on analysis of the audio signals, a first speaker associated with the first speech and a second speaker associated with the second speech, wherein the first speaker is determined to be the agent and to be speaking the agent language in response to speech characteristics of the first speech matching the agent voiceprint, and wherein the second speaker is determined to be the customer in response to the speech characteristics not matching the agent voiceprint;

determining, based on further analysis of the audio data, a customer language comprising a language spoken by the customer;

translating, by the processor, the second speech represented by the audio data to the agent language;

outputting, by the processor and at a display of the agent device, first text representing a translation of the second speech in the agent language;

translating, by the processor, the first speech to the customer language; and outputting, by the processor and at the display of the agent device, second text representing a translation of the first speech.

8. The method of claim 7, wherein identifying the first speaker comprises determining that the first speech is spoken in the agent language.

9. The method of claim 7, wherein outputting the first text and the second text at the display of the agent device comprises:

generating a user interface comprising the first text oriented in a first orientation and the second text oriented in a second orientation that is upside down relative to the first orientation; and displaying the user interface at the agent device.

10. The method of claim 7, wherein the agent voiceprint is generated at the agent device, and wherein generating the agent voiceprint comprises:

obtaining, the sound hardware, further audio data that represents a voice associated with the agent;

creating, based on the further audio data, the agent voiceprint; and storing the agent voiceprint with a data association that associates the agent voiceprint with the agent.

11. The method of claim 10, wherein the agent voiceprint defines:

a frequency of the voice associated with the agent;

an intonation of the voice associated with the agent; and a timbre of the voice associated with the agent.

12. The method of claim 7, wherein determining the customer language comprises:

determining a language likelihood threshold that is defined for the agent device, the language likelihood threshold comprising a minimum probability that the second speech is spoken in a particular language;

identifying a language that meets the language likelihood threshold; and outputting language information that identifies the language.

13. The method of claim 7, wherein determining the customer language comprises:

determining a language likelihood threshold that is defined for the agent device, the language likelihood threshold comprising a minimum probability that the second speech is spoken in a particular language;

identifying a plurality of languages that meet the language likelihood threshold; and outputting, on the display of the agent device, a display of a ranked language listing that identifies the plurality of languages in an order from largest probability to smallest probability, wherein a respective identifier of each of the plurality of languages is translated into a corresponding language, and wherein the customer language is selected from the ranked language listing to determine the customer language.

14. The method of claim 7, wherein determining the customer language comprises:

determining a first language spoken at a flight origin associated with a flight and a second language spoken at a flight destination associated with the flight, determining that the second language corresponds to the agent language, and determining that the first language comprises the customer language.

15. A system comprising a processor and a memory that stores computer-executable instructions that, when executed by the processor, cause the processor to perform operations comprising:

detecting, at an agent device comprising sound hardware, a conversation between an agent and a customer, wherein data defining an agent language spoken by the agent and an agent voiceprint is stored at the agent device, and wherein the agent voiceprint comprises a unique pattern of voice characteristics of the agent;

capturing, using the sound hardware and during the conversation, audio data associated with the conversation, wherein the audio data comprises audio signals captured using the sound hardware, and wherein the audio signals represent first speech associated with the agent and second speech associated with the customer;

identifying, based on analysis of the audio signals, a first speaker associated with the first speech and a second speaker associated with the second speech, wherein the first speaker is determined to be the agent and to be speaking the agent language in response to speech characteristics of the first speech matching the agent voiceprint, and wherein the second speaker is determined to be the customer in response to the speech characteristics not matching the agent voiceprint;

determining, based on further analysis of the audio data, a customer language comprising a language spoken by the customer;

translating the second speech represented by the audio data to the agent language;

outputting, at a display of the agent device, first text representing a translation of the second speech in the agent language;

translating the first speech to the customer language; and outputting, at the display of the agent device, second text representing a translation of the first speech.

16. The system of claim 15, wherein identifying the first speaker comprises determining that the first speech is spoken in the agent language.

17. The system of claim 15, wherein outputting the first text and the second text at the display of the agent device comprises:

generating a user interface comprising the first text oriented in a first orientation and the second text oriented in a second orientation that is upside down relative to the first orientation; and displaying the user interface at the agent device.

18. The system of claim 15, wherein the agent voiceprint is generated at the agent device, and wherein generating the agent voiceprint comprises:

obtaining, the sound hardware, further audio data that represents a voice associated with the agent;

creating, based on the further audio data, the agent voiceprint; and storing the agent voiceprint with a data association that associates the agent voiceprint with the agent.

19. The system of claim 15, wherein determining the customer language comprises:

determining a language likelihood threshold defined for the agent device, the language likelihood threshold comprising a minimum probability that the second speech is spoken in a particular language;

identifying a plurality of languages that meet the language likelihood threshold; and outputting, on the display of the agent device, a display of a ranked language listing that identifies the plurality of languages in an order from largest probability to smallest probability, wherein a respective identifier of each of the plurality of languages is translated into a corresponding language, and wherein the customer language is selected from the ranked language listing to determine the customer language.

20. The system of claim 15, wherein determining the customer language comprises:

determining a first language spoken at a flight origin associated with a flight and a second language spoken at a flight destination associated with the flight, determining that the second language corresponds to the agent language, and determining that the first language comprises the customer language.

* * * * *